(12) United States Patent
Gan et al.

(10) Patent No.: US 11,912,310 B2
(45) Date of Patent: Feb. 27, 2024

(54) AUTONOMOUS DRIVING CRASH PREVENTION

(71) Applicant: TUSIMPLE, INC., San Diego, CA (US)

(72) Inventors: Yiqian Gan, San Diego, CA (US); Yijie Wang, San Diego, CA (US); Xiaodi Hou, San Diego, CA (US); Lingting Ge, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 270 days.

(21) Appl. No.: 17/359,007

(22) Filed: Jun. 25, 2021

(65) Prior Publication Data

US 2021/0403050 A1   Dec. 30, 2021

Related U.S. Application Data

(60) Provisional application No. 63/044,656, filed on Jun. 26, 2020.

(51) Int. Cl.
*B60W 60/00* (2020.01)
*G08G 1/16* (2006.01)
(Continued)

(52) U.S. Cl.
CPC .......... *B60W 60/0027* (2020.02); *G06T 3/40* (2013.01); *G06T 7/62* (2017.01); *G06T 7/73* (2017.01); *G06V 20/58* (2022.01); *G08G 1/165* (2013.01); *G08G 1/166* (2013.01); *B60W 2420/42* (2013.01); *B60W 2554/20* (2020.02); *B60W 2554/4042* (2020.02);
(Continued)

(58) Field of Classification Search
CPC ......... B60W 60/0027; B60W 2554/20; B60W 2554/4042; B60W 2554/4044; B60W 2554/4043; B60W 2420/42; G06T 7/62; G06T 7/73; G06T 3/40; G06T 2207/30261; G06V 20/58; G08G 1/165; G08G 1/166
See application file for complete search history.

(56) References Cited

U.S. PATENT DOCUMENTS

| 11,004,000 B1 * | 5/2021 | Gutmann ........ B60W 60/00272 |
| 11,214,143 B2 * | 1/2022 | Kim .................... B60T 8/17558 |

(Continued)

*Primary Examiner* — Dale W Hilgendorf
*Assistant Examiner* — Hana Lee
(74) *Attorney, Agent, or Firm* — Perkins Coie LLP; Paul Liu

(57) ABSTRACT

A method includes receiving a series of road images from a side-view camera sensor of the autonomous driving vehicle. For each object from objects captured in the series of road images, a series of bounding boxes in the series of road images is generated, and a direction of travel or stationarity of the object is determined. The methods and apparatus also include determining a speed of each object for which the direction of travel has been determined and determining, based on the directions of travel, speeds, or stationarity of the objects, whether the autonomous driving vehicle can safely move in a predetermined direction. Furthermore, one or more control signals is sent to the autonomous driving vehicle to cause the autonomous driving vehicle to move or to remain stationary based on determining whether the autonomous driving vehicle can safely move in the predetermined direction.

19 Claims, 11 Drawing Sheets

(51) Int. Cl.
  *G06T 7/73* (2017.01)
  *G06T 7/62* (2017.01)
  *G06T 3/40* (2006.01)
  *G06V 20/58* (2022.01)

(52) U.S. Cl.
  CPC .............. *B60W 2554/4043* (2020.02); *B60W 2554/4044* (2020.02); *G06T 2207/30261* (2013.01)

(56) References Cited

U.S. PATENT DOCUMENTS

| | | | |
|---|---|---|---|
| 2010/0305857 A1* | 12/2010 | Byrne | G06T 7/73 382/107 |
| 2013/0089259 A1* | 4/2013 | Cha | G06V 20/10 382/173 |
| 2015/0278633 A1* | 10/2015 | Yeh | G06V 20/56 382/103 |
| 2015/0281587 A1* | 10/2015 | Furuta | B60R 1/00 348/240.2 |
| 2019/0103026 A1* | 4/2019 | Liu | G06V 10/25 |
| 2020/0130685 A1* | 4/2020 | Nguyen | B60W 60/001 |
| 2020/0312013 A1* | 10/2020 | Dougherty | G06V 20/64 |
| 2020/0377124 A1* | 12/2020 | Kienle | B60W 60/0027 |

\* cited by examiner

400

```
┌─────────────────────────────────────────────────────────────┐
│ Receiving a series of road images from a side-view camera   │─410
│ sensor, wherein each image in the series of road images is  │
│ taken at a different time                                   │
└─────────────────────────────────────────────────────────────┘
                              │
┌─────────────────────────────────────────────────────────────┐
│ Determining a series of bounding boxes for objects in the   │─420
│ series of road images                                       │
└─────────────────────────────────────────────────────────────┘
                              │
┌─────────────────────────────────────────────────────────────┐
│ Determining a direction of travel or stationarity for each  │─430
│ object in the bounding boxes                                │
└─────────────────────────────────────────────────────────────┘
                              │
┌─────────────────────────────────────────────────────────────┐
│ Determining a speed or stationarity of each object in the   │─440
│ bounding boxes                                              │
└─────────────────────────────────────────────────────────────┘
                              │
┌─────────────────────────────────────────────────────────────┐
│ Determining, based on the directions of travel, speeds, or  │─450
│ stationarity of the objects, whether the autonomous driving │
│ vehicle can safely move in a predetermined direction        │
└─────────────────────────────────────────────────────────────┘
                              │
┌─────────────────────────────────────────────────────────────┐
│ Sending one or more control signals to the autonomous       │
│ driving vehicle to cause the autonomous driving vehicle to  │─460
│ move or to remain stationary based on the determining       │
│ whether the autonomous driving vehicle can safely move in   │
│ the predetermined direction                                 │
└─────────────────────────────────────────────────────────────┘
```

810 — Determining, from a series of images of one or more roads captured by a camera sensor, a plurality of three-dimensional boundaries for the one or more roads 820 — Selecting a series of points in a three-dimensional space surrounding the autonomous vehicle within the plurality of three-dimensional boundaries for the one or more roads 830 — Determining for each of the series of points whether an object is present 840 — Determining a stationarity or a direction of travel and a speed for each object that is present 850 — Determining, based on the direction of travel, the speed, or stationarity of each object, whether the autonomous driving vehicle can safely move in a predetermined direction 860 — Sending one or more control signals to the autonomous driving vehicle to cause the autonomous driving vehicle to move or to remain stationary based on the determining whether the autonomous driving vehicle can safely move in the predetermined direction

FIG. 8

AUTONOMOUS DRIVING CRASH PREVENTION

CROSS-REFERENCE TO RELATED APPLICATIONS

This patent document claims priority to and the benefits of U.S. Provisional Patent Application No. 63/044,656, titled "AUTONOMOUS DRIVING CRASH PREVENTION", filed on Jun. 26, 2020. The entire content of the before-mentioned patent application is incorporated by reference as part of the disclosure of this application.

TECHNICAL FIELD

This document relates to autonomous driving systems. In particular, described herein are systems and methods for navigating various road conditions while avoiding collisions with objects in the surrounding areas, both moving and stationary.

BACKGROUND

Autonomous driving requires sensor and processing systems that take in the environment surrounding the autonomous vehicle and make decisions that ensure the safety of the autonomous vehicle and surrounding vehicles. The sensors should accurately determine distances to, and velocities of, potentially interfering vehicles as well as other objects, both movable and immovable. New techniques are needed for assessing various traffic conditions.

SUMMARY

Autonomous vehicles must accommodate various road configurations such as straight roads, curved roads, controlled intersections, uncontrolled intersections, and many others. Autonomous driving systems must make decisions about the speed and distance of traffic, as well as about obstacles including those obstructing the view of the autonomous vehicle's sensors. For example, at intersections, the autonomous driving system must identify vehicles in the path of the autonomous vehicle, or potentially in the path based on a planned path, estimate the distance to those vehicles, and estimate the speeds of those vehicles. Then, based on those parameters for the other vehicles, the road configuration, and environmental conditions, the autonomous driving system must decide if and when it is safe to proceed along the planned path.

An aspect of the disclosed embodiments relates to a camera vision method for an autonomous driving vehicle that includes receiving a series of road images from a side-view camera sensor of the autonomous driving vehicle, wherein each image in the series of road images is taken at a different time. The method also includes generating, for each object from objects captured in the series of road images, a series of bounding boxes in the series of road images, wherein each bounding box corresponds to an image in the series of road images. The method further includes determining, for each object from the objects, a direction of travel or that the object is stationary. The method also includes determining a speed of each object for which the direction of travel has been determined. Furthermore, the method includes determining, based on the directions of travel, speeds, or stationarity of the objects, whether the autonomous driving vehicle can safely move in a predetermined direction. The method also includes sending one or more control signals to the autonomous driving vehicle to cause the autonomous driving vehicle to move or to remain stationary based on the determining whether the autonomous driving vehicle can safely move in the predetermined direction.

Another aspect of the disclosed embodiments relates to an apparatus for an autonomous driving vehicle that comprises at least one processor and a memory. The memory of the apparatus includes executable instructions that, when executed by the at least one processor, cause the apparatus to perform at least the following operations: receive a series of road images from a side-view camera sensor of the autonomous driving vehicle, wherein each image in the series of road images is taken at a different time; generate, for each object from objects captured in the series of road images, a series of bounding boxes in the series of road images, wherein each bounding box in the series of bounding boxes corresponds to an image in the series of road images; determine, for each object from the objects, a direction of travel or that the object is stationary; determine a speed of each object for which the direction of travel has been determined; determine, based on the directions of travel, speeds, or stationarity of the objects, whether the autonomous driving vehicle can safely move in a predetermined direction; and send one or more control signals to the autonomous driving vehicle to cause the autonomous driving vehicle to move or to remain stationary based on the determining whether the autonomous driving vehicle can safely move in the predetermined direction.

Yet another aspect of the disclosed embodiments relates to a non-transitory computer readable medium storing executable instructions for an autonomous driving vehicle that, when executed by at least one processor, cause the at least one processor to perform at least the following: receive a series of road images from a side-view camera sensor of the autonomous driving vehicle, wherein each image in the series of road images is taken at a different time; generate, for each object from objects captured in the series of road images, a series of bounding boxes in the series of road images, wherein each bounding box in the series of bounding boxes corresponds to an image in the series of road images; determine, for each object from the objects, a direction of travel or that the object is stationary; determine a speed of each object for which the direction of travel has been determined; determine, based on the directions of travel, speeds, or stationarity of the objects, whether the autonomous driving vehicle can safely move in a predetermined direction; and send one or more control signals to the autonomous driving vehicle to cause the autonomous driving vehicle to move or to remain stationary based on the determining whether the autonomous driving vehicle can safely move in the predetermined direction.

The above and other aspects and features of the disclosed technology are described in greater detail in the drawings, the description and the claims.

BRIEF DESCRIPTION OF THE DRAWINGS

FIG. 4 depicts an example of a process, in accordance with some embodiments;

FIG. 8 depicts a process for camera vision in an autonomous driving vehicle, in accordance with some example embodiments.

DETAILED DESCRIPTION

Autonomous driving systems (e.g., an autonomous driving vehicle also referred to as an autonomous vehicle) must safely accommodate all types of road configurations and conditions. For example, they must accommodate straight roads, curved roads, controlled intersections, uncontrolled intersections, and many other road configurations. These systems must also account for road conditions such as rain, snow, wind, dust storms, just to name a few. Autonomous driving vehicles must make decisions about the speed and distance of traffic and about obstacles including obstacles that obstruct the view of the autonomous vehicle's sensors. For example, at intersections an autonomous driving vehicle must identify vehicles and objects in its path including those that are potentially in the path based on a planned driving path, and estimate the distances to those vehicles and/or objects, as well as the speeds of those vehicles and/or objects. Then, based on the vehicles that are in the path or potentially in the path, the road configuration and road conditions, the autonomous driving vehicle must decide whether it is safe to proceed along the planned path or not, and when it is safe to proceed. In various embodiments, speeds or velocities of vehicles and/or objects are determined and locations or distances to the vehicles and/or objects are determined as well. For simplicity, the following description uses speed (a scalar value), but velocity (a vector) could also be determined, where velocity is a speed and a direction. Also, distance is used in following description but location (e.g., 3D or 2D coordinates) could also be determined.

Examples of scenarios where these determinations and decisions must be made include so-called "T" intersections, so-called "Y" intersections, unprotected left turns, intersections with a yield where the autonomous vehicle does not have the right-of-way, and an intersection with 4 road sections and two stop signs where the autonomous vehicle must stop and other vehicles are not required to stop (e.g., cross-traffic does not stop), as well as many other road configurations. For all of the foregoing road configurations, the autonomous driving system must decide whether, and when, it is safe to proceed.

Figure 1:
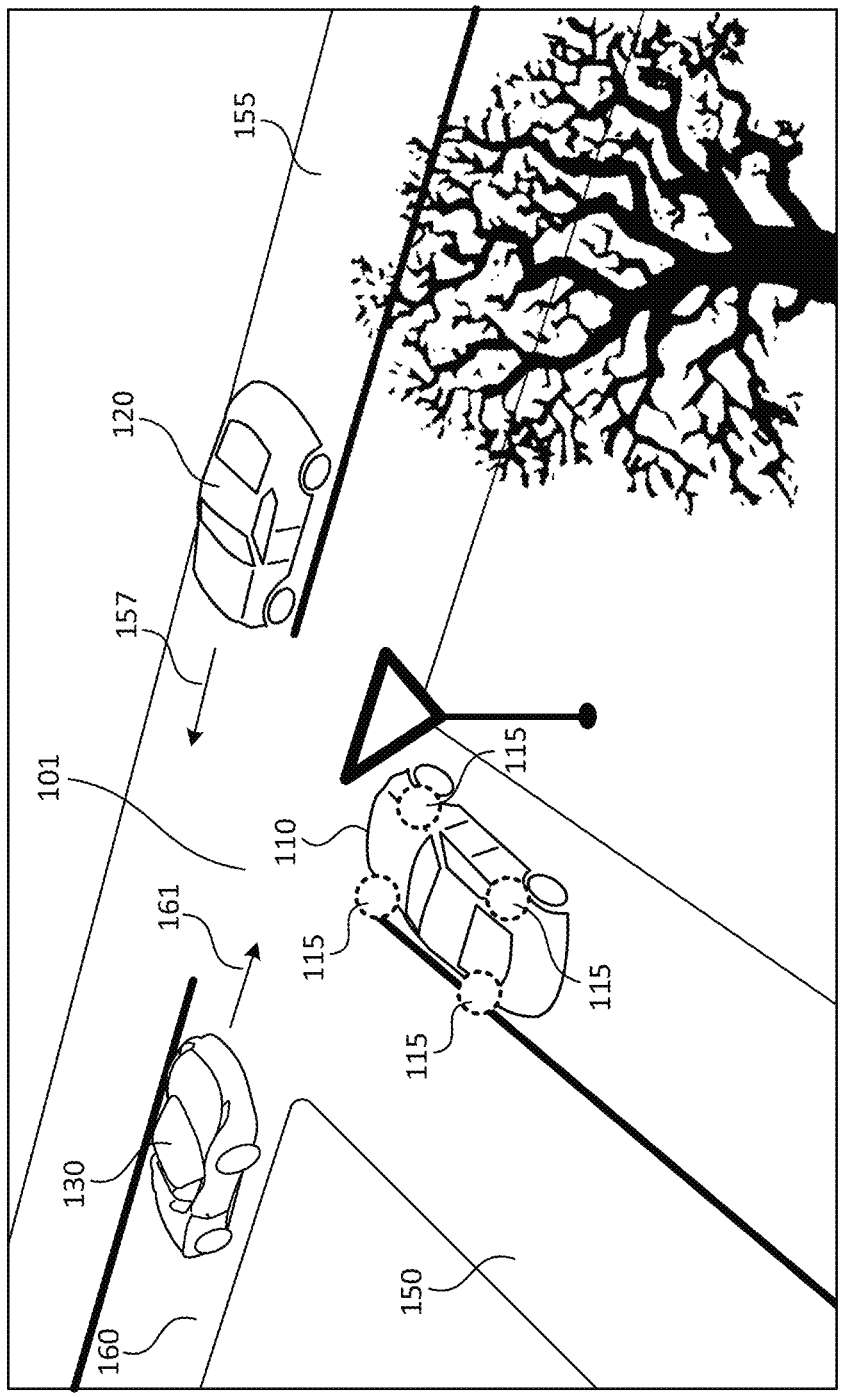
FIG. 1 depicts an illustrative example of a traffic configuration.

FIG. 1 depicts an example illustration 100 of a "T" or a "Y" intersection 101. The intersection 101 is characterized by a road 150 ending where traffic on this road 150 can join traffic on another road 160 which travels in a first direction 161 or join traffic on a road 155 which travels in a second direction 157. For example, directions of the traffic travel 161 and 157 can be different from each other (e.g., they can be opposite to each other). In the example of FIG. 1, vehicles entering the intersection 101 via the road 150 must yield to vehicles traveling on the road 155 in the direction 157 that are passing or near the area of the traffic entrance from the road 150 onto the road 155. The vehicles entering via the road 150 must also yield to vehicles traveling on the road 160 in the direction 161 that are passing the area of traffic entrance from the road 150 and/or that are near that area. In the illustration of FIG. 1, autonomous vehicle 110 is at the intersection 101 of the roads 150, 155, and 160 with cross-traffic vehicle 120 travelling on the road 155 in the direction 157 and cross-traffic vehicle 130 travelling on the road 160 in the direction 161. Autonomous vehicle 110 has one or more cameras 115. The cameras 115 may be aimed, for example, to look to the sides from the vehicle 110 toward the road 155 and toward the road 160. In some example embodiments, some of the cameras 115 may be aimed to observe traffic incoming to the intersection 101 on the road 155 in the direction 157. In certain example embodiments, some of the cameras 115 may be aimed to observe traffic incoming to the intersection 101 on the road 160 in the direction 161. In some example embodiments, at least some of the cameras may point in a fixed direction. For example, cameras on the right side of the vehicle 110 may point toward the road 155 (e.g., in the direction 161) at a fixed pointing angle. Similarly, cameras on the left side of vehicle 110 may point toward the road 160 (e.g., in the direction 157) at a fixed pointing angle. In some example embodiments, cameras 115 may be mechanically or optically steerable to point in different directions, in some cases independently (e.g., at different times). For example, cameras 115 may point toward the front of the vehicle 110 when the vehicle 110 is moving forward or backward and may point to the sides of the vehicle 110 when the vehicle 110 has stopped. For example, cameras 115 may point toward the front of the vehicle 110 when the vehicle 110 is moving forward and point toward the back of the vehicle 110 when the vehicle 110 is moving backward.

Figure 2:
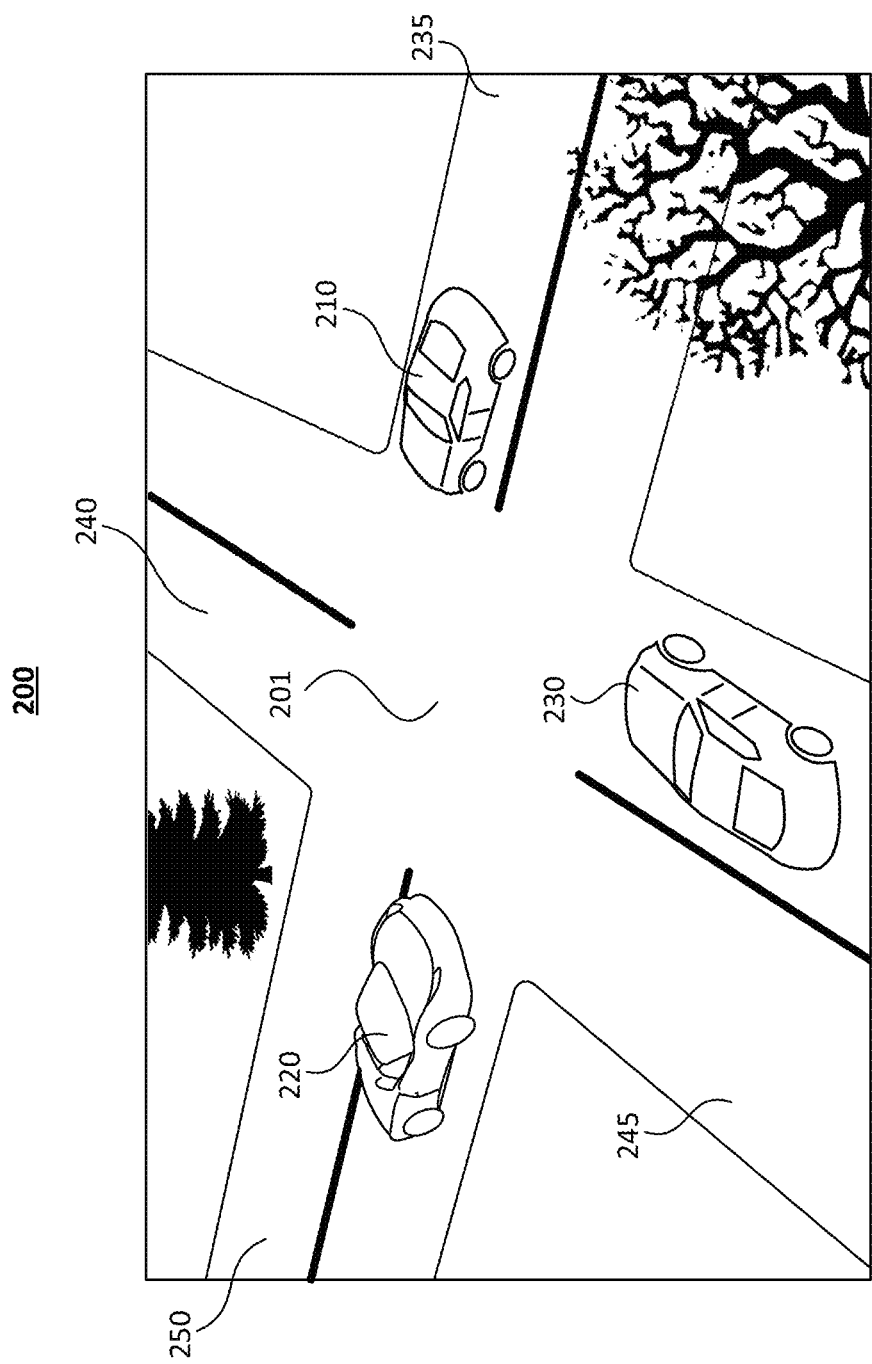
FIG. 2 depicts another illustrative example of a traffic configuration.

FIG. 2 depicts an example illustration 200 of a four-way intersection 201. The four-way intersection is characterized by an intersection of two crossing roads. Such roads have four branches such as branches 235, 240, 245, and 250 (the branches are also referred to as roads herein). In the illustration of FIG. 2, autonomous vehicle 230 is at the intersection of the roads 235, 240, 245, and 250 with cross-traffic vehicle 220 travelling in the direction from 250 to 235 and cross-traffic vehicle 210 travelling in the direction from 235 to 250. Autonomous vehicle 230 has one or more cameras as described with respect to FIG. 1.

Several aspects must be determined in order to make the "safe to go" decision for intersections including the "T", "Y", and four-way intersections when the right-of-way may belong to traffic moving in the perpendicular direction. For example, the speeds of and distances to oncoming traffic (e.g., other vehicles), locations of stopped traffic that could interfere with the autonomous vehicle, and whether the sensors of the autonomous vehicle are blocked by fixed objects or other vehicles (which can be moving or stationary) must be determined. The distances to oncoming vehicles on the road perpendicular to the road on which the autonomous vehicle is on, and the speed of each oncoming vehicle must be accounted for before a decision to go is made. Proceeding with a left turn at a "T" intersection when oncoming cars are too close and/or travelling too fast would be very dangerous. Also, it must be determined whether the view of the road obtained or observed by the autonomous vehicle's cameras and other sensors such as light detection and ranging (LiDAR) sensors is blocked because of, e.g., large cars, trucks, fixed objects, or other blockages, so that sufficient information about oncoming vehicles is not available. Such blockages or occlusions may prevent a valid "safe to go" decision from being made. Conservative and safe decisions are needed when the vehicle does not have the right-of-way. To make a conservative and safe decision given the challenges mentioned above, a self-driving (also referred to herein as "autonomous") car or truck must estimate the distances to (or locations of) objects and the speeds of those objects.

Vehicles and obstructions are identified, and then their distances and velocities or speeds are determined. Identified vehicles within certain ranges of speed and distance can potentially interfere with the autonomous vehicle and must be taken into account. The estimated speeds and distances for objects will have noise including a bias and a variance. Examples of algorithms that could be used include: 1) a machine learning classification model (e.g., random forest, support vector machine (SVM), and so on); 2) Rule-based methods such as a decision tree model. A hard threshold may be determined for each parameter that can lead to interference.

For example, vehicles moving toward the autonomous vehicle or in the planned path of the autonomous vehicle that are at a close range from the autonomous vehicle must be avoided. Vehicles that are at a greater distance from the autonomous vehicle but that are travelling at a high speed must also be avoided. Vehicles that are stopped or are at a very large range (e.g., 1000 m) from the autonomous vehicle may be ignored unless such a vehicle is travelling at a very high speed. In some implementations, a metric that may be used for determining whether an identified vehicle will potentially interfere with a projected path of the autonomous vehicle is a ratio of a distance to the identified vehicle to the speed of the identified vehicle. Such a metric can reflect a duration of time that it would take the identified vehicle to reach the autonomous vehicle. In some implementations, the distance to the identified vehicle is a length of a path along the road on which the identified vehicle is traveling. The larger the value of this ratio, the less of a threat the identified vehicle presents to the autonomous vehicle, and the smaller the value of the ratio, the more of a threat the identified vehicle is. That is to say, the larger the value of this ratio, the less urgent it is to consider the vehicle as an obstacle to the path of the autonomous vehicle. In this way, faster moving or closer vehicles interfere more, and slower or more distant vehicles interfere less. Other parameters that may be considered when determining if it is safe to proceed include the type of vehicle (e.g., car, truck or bicycle), any assumed behaviors of particular types of vehicles (e.g., tendency to yield).

Examples of sensors that can be used on autonomous vehicles include: LiDAR sensors, cameras, RADAR sensors, and the like. Using data from these sensors, the distances and speeds of potentially interfering vehicles can be obtained. Along with the distances to potentially interfering vehicles and objects, the locations of the vehicles and objects may be determined within the range of distances and accuracy that each sensor is capable of providing. For example, a LiDAR sensor may have a maximum range of measurement of 50 or 100 meters. Within the maximum range, the sensor can accurately determine distances and speeds to/of other vehicles and objects.

In some implementations, a typical self-driving truck needs to get accurate estimates of the speed and distance or location of objects (e.g., vehicles) that are within about 150 meters (~500 feet) from the truck when the speed limit is about 70 km/h (~45 mph), about 85 meters (~280 feet) from the truck when the speed limit is about 40 km/h (~25 mph), about 184 meters (~600 feet) when the speed limit is about 90 km/h (~55 mph), and about 234 meters (~768 feet) when the speed limit is about 110 km/h (~70 mph). In some implementations, an autonomous vehicle needs to have distance and speed information about vehicles and objects that are within a range of about 10 seconds +/−2.5 seconds from the autonomous vehicle which, for example, has stopped at an intersection. Other ranges of time can be used as well. In some example embodiments, the autonomous vehicle needs to have information about distances to vehicles and objects and/or information about speeds of those vehicles and objects that are going to pass the autonomous vehicle (which can be moving or can be stationary) in the next 10+/−2.5 seconds or the next 5+/−1 seconds or the next 15+/−3 seconds or the next 20+/−5 seconds, for example.

Some of the challenges with sensors include: LiDAR devices with insufficient range capability and difficulty using forward-looking cameras to estimate the speed of and distance to vehicles approaching from a side of the autonomous vehicle as is the case for cross traffic at intersections and occlusions. Moreover, LiDAR and RADAR devices have been too expensive to include as many of these types of sensors as may be needed to accommodate different cross-road angles at various intersection configurations.

The disclosed techniques and devices include a computer vision solution using cameras aimed away from a side of the autonomous vehicle to detect potentially interfering vehicles and objects. The images are processed to determine when and if it is "safe to go" (e.g., safe to proceed along a planned path) in a "T"-type and many other types of intersections. Cameras aimed toward space on the side of the autonomous vehicle (e.g., the areas surrounding the vehicle to the right and left) capture images, and image processing of the images captured by the cameras are used to generate bounding boxes for objects identified by the image processing, according to the disclosed technology.

As used herein, a bounding box may be a boundary related to an object in a sensor result such as a camera image, a LiDAR image, a RADAR image, or another detection result of a sensor. The boundary may have a shape such a rectangular, square, circular, trapezoidal, parallelogram, or any other (e.g., arbitrary) shape. In some implementations, the boundary may not have a named shape, or may follow the boundary of an arbitrarily shaped object. The boundary may be a two-dimensional boundary or a three-dimensional boundary of an object. The boundary may be a voxel (or include multiple voxels) or a segmentation mask or a map, for example.

Figure 3:
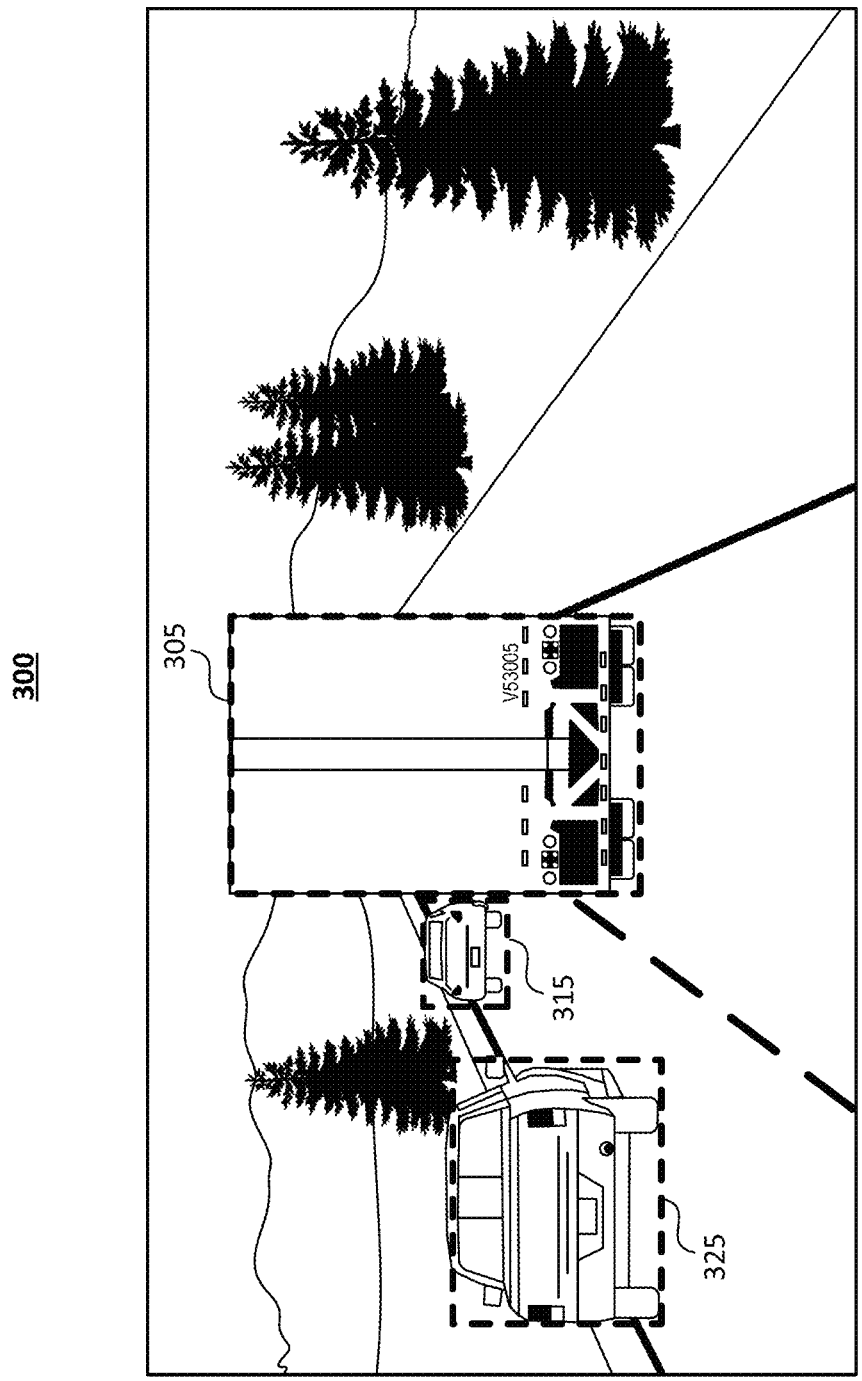
FIG. 3 depicts examples of bounding boxes generated from camera data, in accordance with some embodiments.

FIG. 3 depicts examples of bounding boxes generated from camera data. Bounding boxes 305, 315, and 325 are generated from images taken by one or more cameras. In FIG. 3, the bounding boxes 305, 315, and 325 are shown in the context of a representative image 300. The images are analyzed by a computer vision system or an image processor to identify objects and generate bounding boxes that outline the objects. In some implementations, deep learning or neural networks may be used to generate bounding boxes. Bounding box 305 corresponds to a semi-truck, bounding box 315 corresponds to a first pick-up truck, and bounding box 325 corresponds to a second pick-up truck.

The distance to an object (e.g., a vehicle) and the speed of the object (e.g., relative to another object) can be identified by image processing which can also determine the bounding boxes for each object. The speed of an object can be determined, for example, from the time history of the bounding boxes associated with the object. Based on the distance to the object and the speed of the object, an amount of time before a possible crash between the object and the autonomous vehicle may be determined. This estimated time before a possible collision or crash may be referred to as a time to crash (TTC). Position and/or distance estimation may be done using various sensors and algorithms. For example, position can be estimated with a single camera using a projection technique and intrinsic and extrinsic camera parameters, or position can be estimated using stereo cameras and geometrical relationships, or position can be estimated using LiDAR, or a combination of the foregoing. Speed estimation may use Kalman filtering or other estimation techniques. Position and speed information may both include noise. Based on the position estimation and speed estimation, a machine learning model may be generated (e.g., XGBoost, random forest (or random decision forest), and so on) to predict the time to crash. When the autonomous vehicle is stopped, the images captured by the cameras (e.g., located on or in the vehicle) are more stable. This stability can lead to better estimates of speed and distance. In contrast, when the autonomous vehicle is moving, the image quality and hence distance and velocity estimates may be noisier, thus causing less accurate estimates. By capturing images when the autonomous vehicle is stopped, better distance and speed data can be determined. Specially designed camera mounting devices may be used to reduce vibration of the camera allowing for more accurate estimates while the autonomous vehicle is moving.

A first challenge that technology disclosed in this patent document overcomes is imaging vehicles and objects at distances of 150 meters or more. Long focus cameras can provide long distance detection, but the field of view will be limited. A short focus camera will have a wider field of view, but the detection distance is limited. The disclosed techniques include dynamically cropping captured images to zoom in the road area on both sides of a road crossing. Relatively short focus cameras may be used for determining TTC (time to crash) for close objects and long focus cameras may be used for determining TTC for distant objects.

A second challenge the technology disclosed herein overcomes is identification of the direction of travel of moving vehicles identified in successive images. Vehicles moving toward the autonomous vehicle camera will generate bounding boxes that are larger in size in images taken at later times compared to images taken at earlier times. Vehicles moving away from the autonomous vehicle will have bounding boxes that are smaller in size in images taken at later times compared to images taken at earlier times. For vehicles at a close range from the autonomous vehicle, successive bounding boxes can be combined to enable a quick determination of the direction of travel. For vehicles that are far away, a longer history may be used to make a reliable determination of the direction of travel. Distant objects must move a greater distance for the autonomous vehicle to be able to determine whether the bounding boxes are getting smaller or larger, and an estimate of their position will have more noise associated with it. For a first few frames (e.g., approx. 0.3 seconds) the position of a distant object may appear to be moving around somewhat randomly instead of moving in one direction. A direction and position can be determined by accumulating observations (e.g., averaging position from multiple frames and averaging direction from multiple frames).

In some example embodiments, a machine learning system may be used to extract important features such as bounding box categories, bounding box size histories, bounding box relative distance/location histories, and relative moving speed histories, and so on to allow for the determination of a TTC in seconds for the vehicles. The machine learning system may include a deep learning system that takes inputs in the form of images from a camera and/or a point cloud from a LiDAR sensor. The machine learning system learns to detect objects in the images and/or point cloud and returns bounding box information such as object size, object category, object position, etc. Different types of road crossings or roads with a large curvature, a bridge, or a highway ramp may have corresponding different threshold TTC times. Factors such as the road curvature, structure of the road, and angles (along the road and laterally across the road) may affect the TTC threshold. In some example embodiments, parameters may be tuned to find the best TTC threshold for each type of crossing. A TTC time for a particular road and traffic situation with a time greater than or equal to the TTC threshold is safe for the autonomous vehicle to go (e.g., proceed along a trajectory or planned path), and a time less than the threshold is not safe to go.

A motion planning part of the autonomous vehicle system may be signaled when the view toward a side (e.g., left or right) of the autonomous vehicle is blocked to ensure the TTC model disables travelling in the "blind" direction.

The TTC model may determine that it is "safe to go" for multiple consecutive frames before making the "safe to go" decision. The number of frames needed depends on the noise level in the estimated parameters. For example, a position estimate, speed estimate, and/or direction estimate that has greater noise will require a larger number of frames to be analyzed before a "safe to go" decision can be made. A virtual vehicle may be added to the TTC model if a vehicle was detected and was moving toward the autonomous vehicle and later vanished from detection. This assures continuous tracking of vehicles. In this situation, a timer must count down to zero before deciding it is safe to go. For example, the countdown timer may be set to a time value that is dependent on the last known position and speed of the vehicle. Vehicles that are farther away or slow moving may have the countdown timer set to higher values. A safe buffer amount of time may be added to the countdown time to ensure safety.

A "position lock" may be used to cause an autonomous truck to stop at a good location with a good view of cross traffic vehicles in both directions. There are pre-set points that the truck may reach before the TTC model indicates (or determines) that it is safe for the tuck to go. Also, the TTC model can check side camera image quality before making the TTC prediction. Road test information may be used to determine "position lock" locations.

Although "T" and "Y" intersections are described above, the disclosed methods and systems may be used on many other types of road configurations such as four-way stops, road merges, lane closures, uncontrolled intersections and controlled intersections. The technology disclosed in this patent document can be used to aid in accident avoidance at uncontrolled intersections by causing the autonomous vehicle to slow down when approaching intersections with traffic.

FIG. 4 depicts a process 400, in accordance with some example embodiments. The process 400 includes various features described above in the forgoing and in FIGS. 1-3. At 410, the process includes receiving a series of road images from a side-view camera sensor, wherein each image in the series of road images is taken at a different time. At 420, the process includes determining a series of bounding boxes for objects in the series of road images. At 430, the process includes determining a direction of travel or stationarity (e.g., that the data with respect to the motion of an object is not changing over time) for each object in the bounding boxes. At 440, the process includes determining a speed or stationarity of each object in the bounding boxes. At 450, the process includes determining, based on the directions of travel, speeds, or stationarity of the objects, whether the autonomous driving vehicle can safely move in a predetermined direction. At 460, the process includes sending one or more control signals to the autonomous driving vehicle to cause the autonomous driving vehicle to move or to remain stationary based on the determining whether the autonomous driving vehicle can safely move in the predetermined direction.

Figure 5:
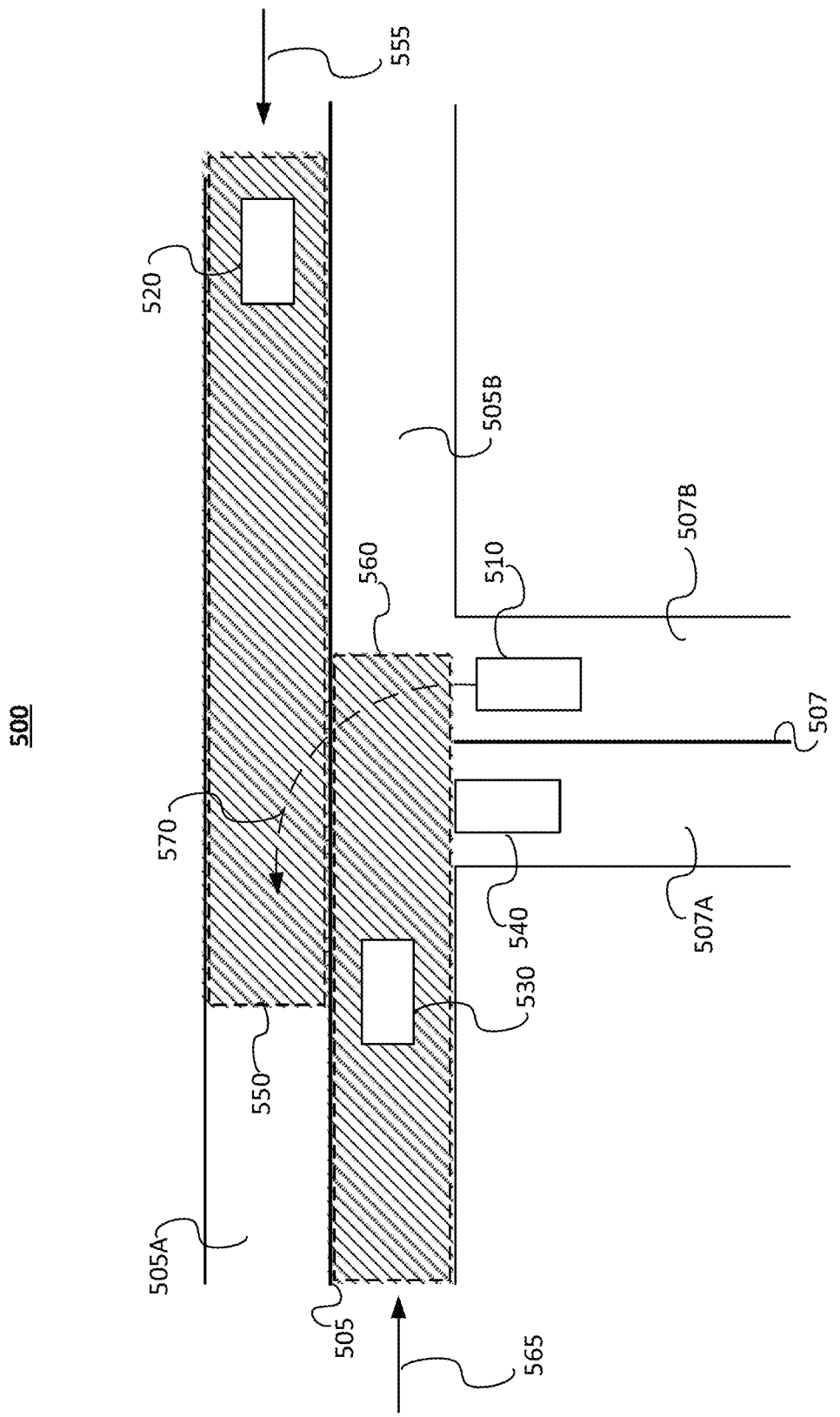
FIG. 5 depicts an illustrative example of a geofence for reducing the number of spatial analysis points, in accordance with some embodiments.
Figure 6A:
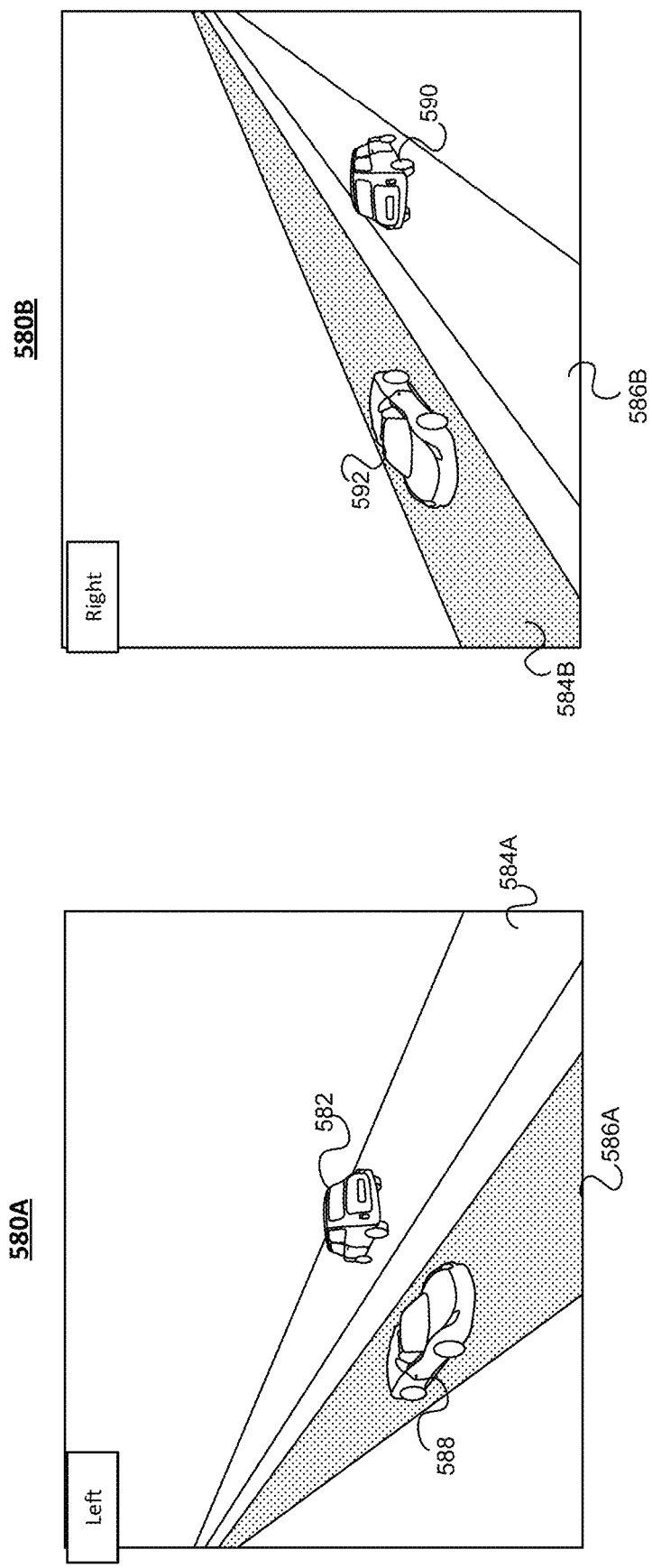
FIG. 6A depicts an example of an image looking out toward the left side of an autonomous vehicle and another example of an image looking out toward the right side of the autonomous vehicle, in accordance with some embodiments.
Figure 6B:
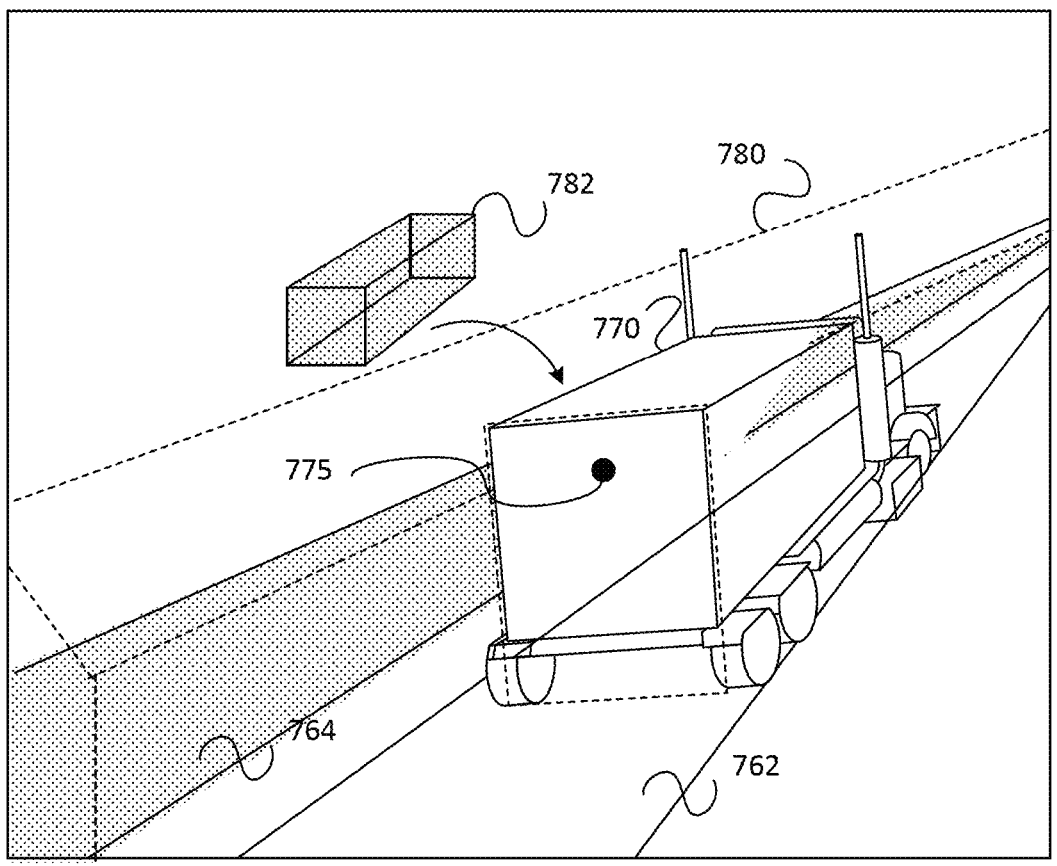
FIG. 6B depicts an example diagram showing a volume that is occluded by a truck, in accordance with some embodiments.
Figure 6C:
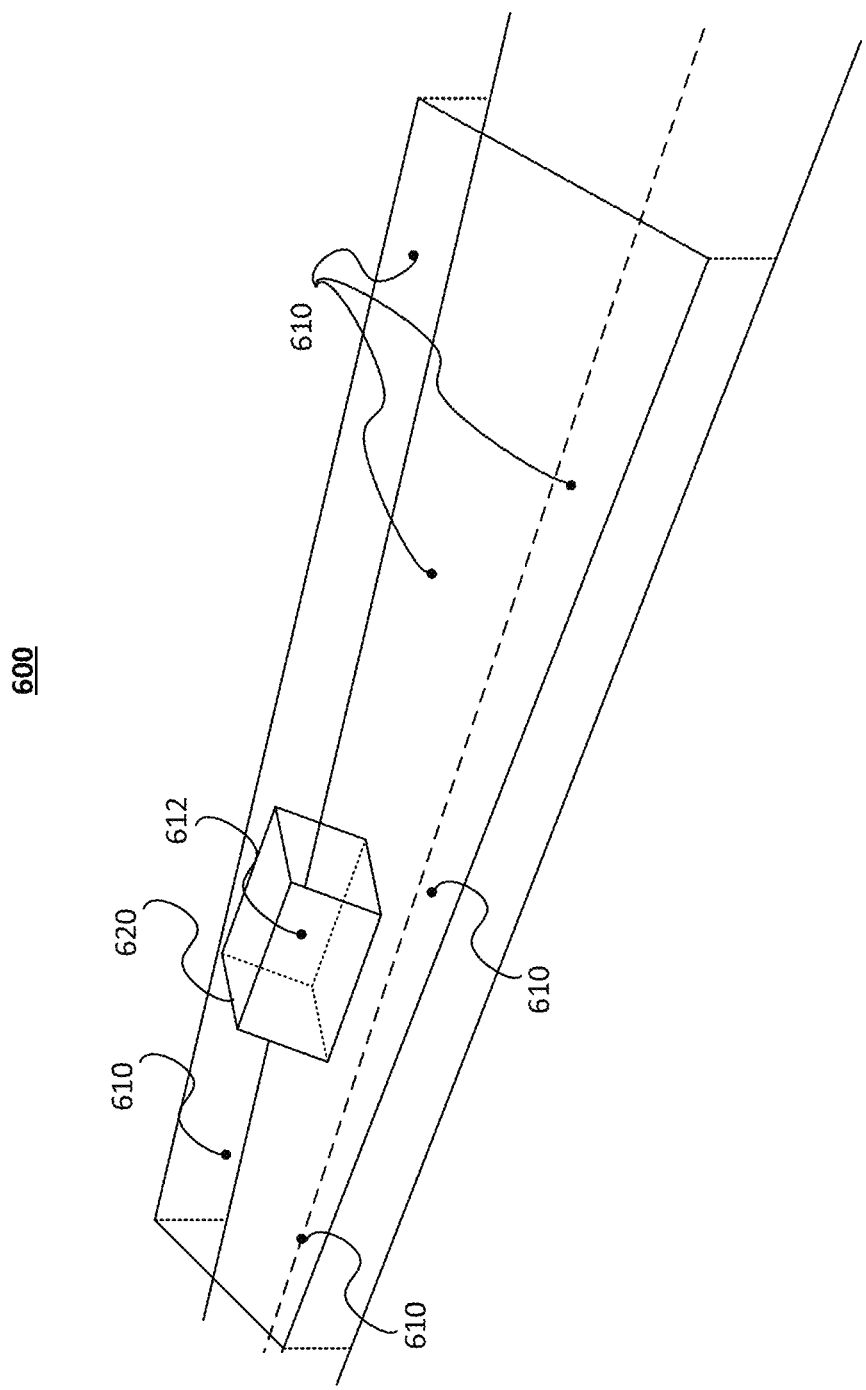
FIG. 6C depicts an illustrative example of reducing a three-dimensional geofence to a two-dimensional geofence, in accordance with some embodiments.
Figure 7:
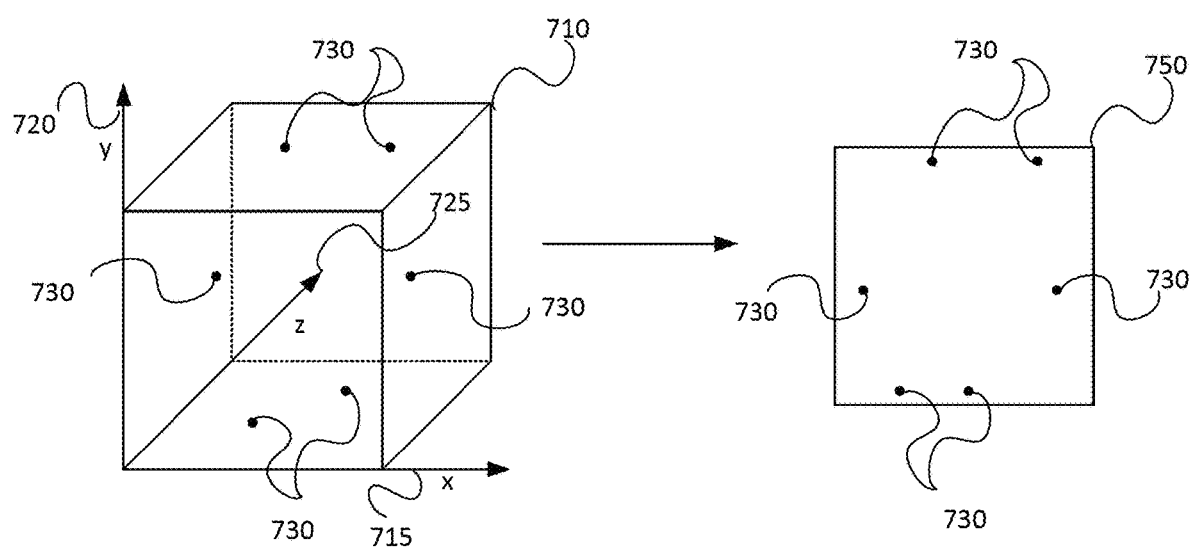
FIG. 7 depicts an illustrative example of reducing a three-dimensional set of analysis points to a two-dimensional set, in accordance with some embodiments.

FIGS. 5-7 show examples of methods for breaking-up a three-dimensional space surrounding the autonomous vehicle while the vehicle is driving or when the vehicle is stopped at an intersection, for example. Instead of, or in addition to, using bounding boxes to represent potentially interfering vehicles and objects, points in space may be chosen. The characteristics of the points, including whether or not an object is at each point (e.g., the presence of an object) and a speed of the object, are determined at the points only and not at other locations in the space surrounding the autonomous vehicle. For example, points in three-dimensional space can be selected to represent the space. For example, points may be selected to be uniformly distributed throughout the three-dimensional space surrounding the autonomous vehicle. In another example, the points may be distributed randomly with a predetermined average density. Because including all the space around the autonomous vehicle could lead to a computationally impossible number of points to process, points can be selected based on their location relative to the autonomous vehicle's location and a planned path of the autonomous vehicle. Points outside the planned path but in areas where interfering vehicles may be present may also be selected. Points outside the planned path and outside areas where a potentially interfering vehicles may be present may be ignored. In this way, the selected points represent a volume that the perception system and autonomous driving system should analyze to determine if it is safe to go (e.g., proceed along the planned path). This may be referred to as three-dimensional geofencing.

A controller may determine which intersections need use a TTC (time to crash) module using predetermined positions and directions. To ensure visibility, the TTC module will determine whether the autonomous vehicle is in a usable starting location and pointing in a correct direction. When the autonomous vehicle is not in a usable location or pointed in the wrong direction, the TTC may determine to no-go.

In some example embodiments, a "position lock" logical state is true when the autonomous vehicle is in a usable location and pointing in a correct direction and false when either the vehicle is not in a usable location, or it is pointing in an incorrect direction. When the "position lock" is false the autonomous vehicle should move to a correct or usable location and direction. Once the autonomous vehicle is in a correct, or useable, location and direction, a two-dimensional geofence, a three-dimensional geofence, and occlusion detection may be performed. When a potentially interfering vehicle is detected, the autonomous vehicle should not proceed.

In a three-dimensional geofence, interfering vehicles are determined in three-dimensional world coordinates in a volume of interest. The three-dimensional geofence volume of interest can have a smaller footprint than the two-dimensional geofence area of interest because there is more confidence regarding the three-dimensional locations within the LiDAR perception range which is about 0-100 meters. If any vehicle is detected in three-dimensional geofence volume of interest, the system may determine that movement is likely a no-go. An interaction model may be used to make exceptions in the decision-making process regarding go and no-go (e.g., whether to proceed on a planned path or remain in the current position).

FIG. 5 depicts an illustrative example 500 of breaking-up the three-dimensional space surrounding autonomous vehicle 510. Autonomous vehicle 510 is planning to make a left turn from road 507 to road 505 along path 570. As noted above, analyzing all the three-dimensional space surrounding the autonomous vehicle 510 could require more computational resources than are available (points not shown in FIG. 5). Moreover, all the surrounding space does not need to be analyzed because interference with the planned path 570 for many parts of that space is unlikely or impossible. The boundaries of the space to analyze for a particular type of road topography or intersection may be determined via testing to determine conservative analysis boundaries for each particular type of road condition. In the example of FIG. 5, the spaces where objects such as the vehicle 530 that may interfere with the autonomous vehicle 510 can be include a portion of the lane 505B of the road 505 which the autonomous vehicle 510 must cross when taking the path 570 and a portion of the lane 505A of the road 505 where the autonomous vehicle 510 is entering the lane 505A. The space where potentially interfering objects may be present in the lane 505B is shown at 560. The space 560 includes space where oncoming traffic may interfere and extends away (to the left) from the autonomous vehicle 510 to where normal oncoming traffic (cross traffic from the left which is moving in the direction 565) will not interfere because the oncoming traffic is too far away. As also shown in FIG. 5, the vehicle 540 is leaving the space 560 and entering the lane 507A that is next to the lane 507B of the road 507 in which the autonomous vehicle 510 is positioned. The lane 507A has a traffic pattern in the opposite direction to that of the lane 507B. The space where potentially interfering objects may be present in the lane 505A is shown at 550. As shown in FIG. 5, the vehicle 520 is travelling in the space 550. Space 550 includes space where oncoming traffic (traffic moving in the same direction 555 as the planned direction of travel of the vehicle 510) may interfere with the progression of the vehicle 510 along the path 570 and extends away (to the right) from the autonomous vehicle 510 to where normal oncoming traffic moving in the direction 555 will not interfere. By reducing the space to analyze to 550 and 560 instead of the whole space with no limits, the computational complexity is greatly reduced. As described above, in some example embodiments, the space may be represented by points distributed in three-dimensional space, or by points in two-dimensional space.

Adjustments to three-dimensional geofence may include occlusion detection. Analysis of the data from the LiDAR and camera sensors may determine that an object is blocking the sensor's view in some portion of the interior of the geofence. For example, vehicle 530 in FIG. 5 may be occluding the sensors of the autonomous vehicle 510 thereby preventing the sensors from having a sufficient view of the roadway to gather sufficient data to determine whether it is safe to proceed. The occlusion by the vehicle 530 may require the autonomous driving system to wait until the view is no longer occluded when sensor data can be collected, and a determination is made that it is safe for the autonomous vehicle to proceed. Another adjustment to the geofence may include velocity dependent geofencing. For example, if a potentially interfering vehicle is closing in at a high speed on the area of the planned path for the autonomous vehicle, the geofence may be extended a greater distance from the autonomous vehicle than if the potentially interfering vehicle was travelling at the speed limit or less. In this way the size of the geofence may change as a function of the speeds or velocities of the potentially interfering vehicles.

FIG. 6A depicts an example of an image looking out toward the left side of an autonomous vehicle and another example of an image looking out toward the right side on the autonomous vehicle. By inverse projection using the camera pose, lane boundaries of interest are projected back to the images (the area of interest on an image is a 2D geofence). With an accurate camera pose, it is possible to determine if a vehicle is interfering with a spatial area of interest in the three-dimensional world (e.g., an area that extends to over 300 meters). Interference may be determined by comparing a vehicle bounding box for a potentially interfering vehicle with a two-dimensional geofence area.

For example, left image 580A shows vehicle 582 in lane 584A moving away from the autonomous vehicle and vehicle 588 on lane 586A moving toward the autonomous vehicle. Lane 586A is part of the two-dimensional geofence because it is one of the areas where a vehicle such as the vehicle 588 can interfere with the autonomous vehicle. Lane 584A is not a part of the two-dimensional geofence because no vehicles on lane 584A can interfere with the autonomous vehicle. Right image 580B shows vehicle 590 in lane 586B moving away from the autonomous vehicle and vehicle 592 on lane 584B moving toward the autonomous vehicle. Lane 584B is in part of the two-dimensional geofence because it is one of the areas where a vehicle such as the vehicle 592 can interfere with the autonomous vehicle. Lane 586B is not a part of the two-dimensional geofence because no vehicles on lane 586B can interfere with the autonomous vehicle. Lane 584B and lane 584A correspond to the same roadway lane and lane 586B and lane 586A correspond to the same roadway lane.

The geofence boundary may change for different vehicles or roadway types. For example, a fast-moving larger vehicle will cause a longer range two-dimensional geofence. In the event that there is insufficient confidence in the camera pose to determine the two-dimensional geofence, a no-go decision (i.e., a decision not to proceed) may be made. A tracking error may be caught by finding a vehicle in the area of interest of the two-dimensional geofence that had previously disappeared such as passing behind an occlusion. This may provide extra protection for the autonomous vehicle.

FIG. 6B depicts an example diagram showing a volume that is occluded by a truck. An occlusion can happen, for example, when a vehicle or object positioned to the right of the autonomous vehicle is moving away from the autonomous vehicle where the object may block the view to the right of oncoming traffic while the autonomous vehicle is trying to make an unprotected left turn. For example, truck 770 may block the view of the autonomous vehicle in an occluded volume 775. To determine if there is an occlusion of oncoming traffic, it must be determined whether a vehicle or moving object could be hidden in the blocked area. A three-dimensional volume 782 of interest full of random sample points can be projected back to a two-dimensional image and by calculating a number of points in a bounding box of the occlusion, the volume of the occluding vehicle or object can be estimated. When the volume is large enough to hide a car, bicycle, or pedestrian, the autonomous vehicle may not proceed until the occlusion moves and the occluded volume can be analyzed for interferers. The number of points in a bounded volume is proportional to the physical volume. In the example of FIG. 6B, truck 770 is moving away in lane 762. The autonomous vehicle plans to make a left turn in the leftward extension of lane 764. Lane 764 corresponds to one of the two-dimensional geofence areas because vehicles in lane 764 occluded by truck 770, or not occluded, may interfere with the autonomous vehicle. Three-dimensional volume or geofence 780 may be converted to a two-dimensional geofence shown as shading in lane 764.

FIG. 6C depicts an illustrative example of reducing a three-dimensional geofence to a two-dimensional geofence. For example, points 610 may be selected in a similar manner to the three-dimensional points described above but at a fixed height such as 0.5 m, 1 m, or 1.5 m off the ground. The two-dimensional points may be used as a two-dimensional geofence with sensor data taken at the two-dimensional set of points 610. Where the two-dimensional geofence intersects an object such as object 620, data regarding the object will be determined at the points 612 that lie on that intersection.

FIG. 7 depicts an illustrative example of the three-dimensional space surrounding the autonomous vehicle broken up into cubes including cube 710. For example, the cubes may be aligned with an x-axis 715 corresponding to the right and left directions viewed from the sensor, and a y-axis 720 corresponding to up and down directions viewed from the sensor, and a z-axis 725 corresponding a farther or closer distance viewed from the sensor. The cube may contain points 730, where each point has an x value, an y value, and a z value. The three-dimensional cubes may be collapsed into a series of two-dimensional squares including square 750 that may be used as a two-dimensional geofence. In some example embodiments, the points are collapsed into a plane with a single z value while maintaining the x and y values of the points. The series of two-dimensional squares may be analyzed at the points 730 for potentially interfering objects.

By reducing the number of points that are analyzed, the computational complexity is reduced.

FIG. 8 depicts a method or process 800 for camera vision in an autonomous driving vehicle, in accordance with some example embodiments. At 810, the method includes determining a plurality of three-dimensional boundaries for one or more roads from a series of images. The images of the one or more roads are captured by a camera sensor. At 820, the method includes selecting a series of points in three-dimensional space surrounding the autonomous vehicle within the plurality of three-dimensional boundaries for the one or more roads. In some embodiments, the three-dimensional space may be divided into cubes of a fixed size containing one or more of the series of points that may be selected to have a fixed height above the ground such as 0.5 meters, 1.0 meters, 1.5 meters, or another height. At 830, the method includes determining for each of the series of points whether an object is present. In some example embodiments, the method includes determining for each point in the series of points whether an object is present at the point. At 840, the method includes determining a stationarity (e.g., the data with respect to the motion of an object is unchanging over time) or a direction of travel and a speed for each object that is present. In some embodiments, when the determined speed of an object is above a threshold value, some of the points in the three-dimensional space are located farther away than at least one of the three-dimensional boundaries. At 850, the method includes determining whether the autonomous driving vehicle can safely move in a predetermined direction based on the direction of travel, and the speed or stationarity of each object. The determining whether the autonomous driving vehicle can safely move in the predetermined direction for the series of points may require fewer computational resources than determining the safety for the whole space within the plurality of three-dimensional boundaries for the one or more roads. At 860, the method includes sending one or more control signals to the autonomous driving vehicle to cause the autonomous driving vehicle to move or to remain stationary based on the determining whether the autonomous driving vehicle can safely move in the predetermined direction.

In some example embodiments, the method includes reducing an extent of the plurality of three-dimensional boundaries to a space where the presence of the object at the speed of the object in the space interferes with the autonomous driving vehicle moving in the predetermined direction.

In some example embodiments, the method includes determining from the images whether a view of the camera sensor is occluded by an object preventing the camera sensor from capturing the images of at least a portion of the one or more roads. When the view is occluded, the autonomous vehicle is caused to not move, and when the view is not occluded the autonomous vehicle may be permitted to move.

In some embodiments, the cubes may be collapsed in one dimension to generate two-dimensional squares where the one or more of the series of points are represented by a fixed coordinate value in the one dimension and maintain their coordinate values in the other two dimensions before being collapsed.

Figure 9:
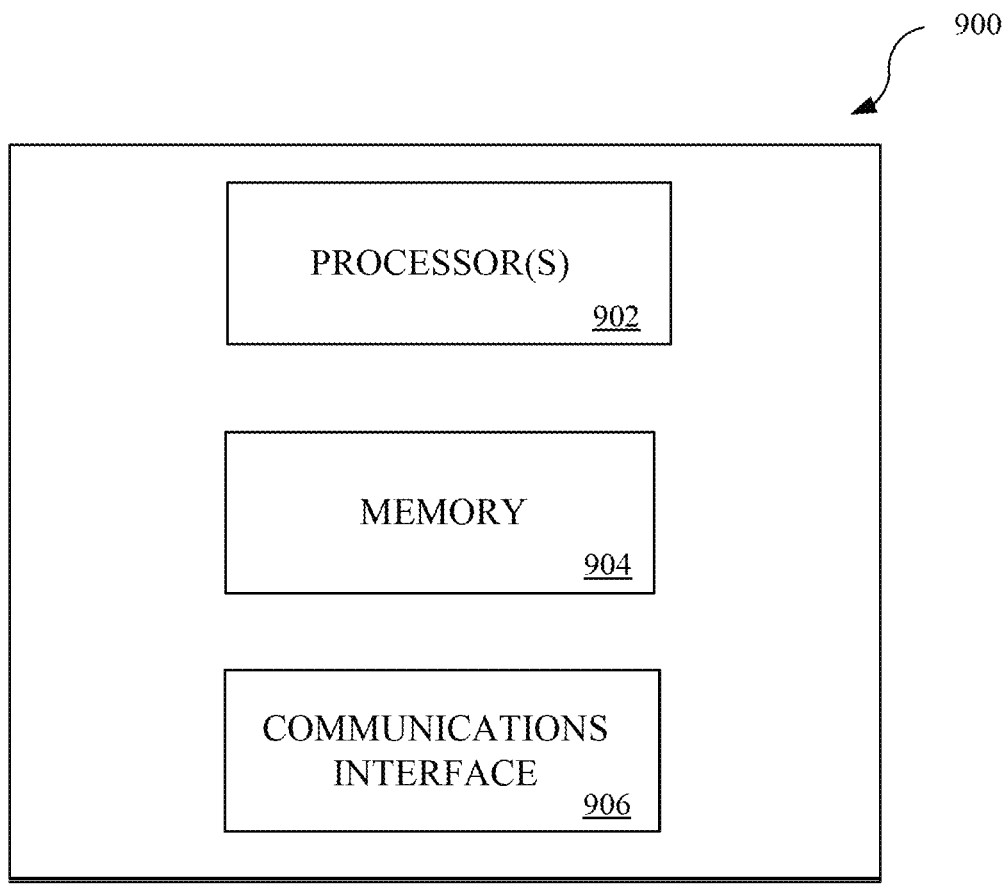
FIG. 9 depicts an example of an apparatus, in accordance with some embodiments.

FIG. 9 depicts an example apparatus 900 according to the disclosed technology. For example, the apparatus 900 may implement the method 400 (shown in FIG. 4), the method 800 (shown in FIG. 8), and/or other methods according to the technology disclosed herein, and/or may include various hardware modules described herein. The apparatus 900 may include one or more processors 902 that can execute code to implement a method. The apparatus 900 may include a memory 904 that may be used to store processor-executable code and/or store data. The apparatus 900 may further include a communications interface 906. For example, the communications interface 906 may implement one or more wired or wireless communication protocols (e.g., Ethernet, LTE, Wi-Fi, Bluetooth, etc.).

Benefits of the technology disclosed in this patent document include the reduced cost of using cameras instead of LiDAR or RADAR sensors for looking to the sides of an autonomous vehicle. The disclosed methods and systems provide for camera image-based determination of cross traffic and determination of the presence of other vehicles and objects, their speeds, locations, and distances to the autonomous vehicle in order for a controller or a machine learning system to determine whether it is safe for the autonomous vehicle to proceed.

An aspect of the disclosed embodiments relates to a camera vision method for an autonomous driving vehicle (also referred to as autonomous vehicle). The method includes receiving a series of road images from a side-view camera sensor of the autonomous vehicle, wherein each image in the series of road images is taken at a different time. The method also includes determining a series of bounding boxes for objects in the series of road images. The method further includes determining a direction of travel or stationarity for each object in the bounding boxes, as well as determining a speed or stationarity of each object in the bounding boxes. The method also includes determining whether the autonomous driving vehicle can safely move in a predetermined direction based on the directions of travel, speeds, or stationarity of the objects. Furthermore, the method includes sending one or more control signals to the autonomous driving vehicle to cause the autonomous driving vehicle to move or to remain stationary based on determining whether the autonomous driving vehicle can safely move in the predetermined direction.

The following features may be present in the camera vision method in any reasonable combination. In the camera vision method, the direction of travel or stationarity of each object can be determined by changes in a size of each bounding box, wherein, when bounding boxes from the series of bounding boxes are larger at later times, they are moving toward the autonomous driving vehicle, and, when bounding boxes from the series of bounding boxes are smaller at later times, they are moving away from the autonomous driving vehicle. Alternatively, or additionally, the speed or stationarity of each object in the bounding boxes can be determined from a rate of change of a size of each bounding box in the series of bounding boxes, such that when a size of a selected bounding box has a larger size change between successive bounding boxes in the series of bounding boxes, an object corresponding to the selected bounding box has a higher speed, and when a size of the selected bounding box has a smaller size change between successive bounding boxes in the series of bounding boxes, the object corresponding to the selected bounding box has a lower speed. In the method, a longer series of road images may be used to determine the direction of travel and the speed of distant objects. When an object determined to be moving toward the autonomous vehicle is present in one of the series of bounding boxes and is not present in one or more later bounding boxes in the series of bounding boxes, a countdown timer can be set to cause the autonomous vehicle to not move until the expiration of the countdown timer. When an object determined to be moving toward the autonomous vehicle is present in one of the series of road images and is not present in one or more later images in the series of road images, a countdown timer can be set to cause the autonomous vehicle to not move until the expiration of the countdown timer. A machine learning device can determine whether the autonomous vehicle can safely move in a predetermined direction, in the method. An image zoom may be performed according to one or more distances to the objects, wherein more image zoom is selected for objects farther from the autonomous driving vehicle and less image zoom is selected for objects closer to the autonomous driving vehicle.

Another aspect of the disclosed embodiments relates to an apparatus for autonomous driving. The apparatus includes at least one processor and a memory storing executable instructions that, when executed by the at least one processor, cause the apparatus to perform at least the following operations: receive a series of road images from a side-view camera sensor, wherein each image in the series of road images is taken at a different time; determine a series of bounding boxes for objects in the series of road images; determine a direction of travel or stationarity for each object in the bounding boxes; determine a speed or stationarity of each object in the bounding boxes; determine, based on the directions of travel, speeds, or stationarity of the objects, whether the autonomous driving vehicle can safely move in a predetermined direction; and send one or more control signals to the autonomous driving vehicle to cause the autonomous driving vehicle to move or to remain stationary based on the determining whether the autonomous driving vehicle can safely move in the predetermined direction.

The following features may be present in the apparatus for autonomous driving in any reasonable combination. In the apparatus, the direction of travel or stationarity of each object may be determined by changes in a size of each bounding box, and in such an apparatus, when bounding boxes from the series of bounding boxes are larger at later times, the objects in those bounding boxes are moving toward the autonomous driving vehicle, and when bounding boxes from the series of bounding boxes are smaller at later times, the objects in those bounding boxes are moving away from the autonomous driving vehicle. The speed or stationarity of each object in the bounding boxes may be determined by the apparatus from a rate of change of a size of each bounding box in the series of bounding boxes, such that when a size of a selected bounding box has a larger size change between successive bounding boxes in the series of bounding boxes, an object corresponding to the selected bounding box has a higher speed, and, correspondingly, when a size of the selected bounding box has a smaller size change between successive bounding boxes in the series of bounding boxes, the object corresponding to the selected bounding box has a lower speed. In the apparatus, a longer series of road images may be used to determine the direction of travel and the speed of distant objects. When an object determined to be moving toward the autonomous vehicle is present in one of the series of bounding boxes and is not present in one or more later bonding boxes in the series of bounding boxes, a countdown timer may be set to cause the autonomous vehicle to not move until the expiration of the countdown timer. When an object determined to be moving toward the autonomous vehicle is present in one of the series of road images and is not present in one or more later images in the series of road images, a countdown timer can be set to cause the autonomous vehicle to not move until the expiration of the countdown timer. The apparatus may use a machine learning device (which, for example, can be a part of the apparatus or, alternatively, can be a separate device that is, for example, externally or remotely located relative to the apparatus; for example, the machine learning device can be a remote server located "in the cloud") to perform the process of determining whether the autonomous driving vehicle can safely move in a predetermined direction. An image zoom may be performed by the apparatus according to one or more distances to the objects, wherein more image zoom is selected for objects farther from the autonomous driving vehicle and less image zoom is selected for objects closer to the autonomous driving vehicle.

Yet another aspect of the disclosed embodiments relates to a non-transitory computer readable medium storing executable instructions for autonomous driving that, when executed by at least one processor, cause the at least one processor to perform at least the following: receive a series of road images from a side-view camera sensor of an autonomous vehicle, wherein each image in the series of road images is taken at a different time; determine a series of bounding boxes for objects in the series of road images; determine a direction of travel or stationarity for each object in the bounding boxes; determine a speed or stationarity of each object in the bounding boxes; determine, based on the determined directions of travel, speeds, or stationarity of the objects, whether the autonomous driving vehicle can safely move in a predetermined direction; and send one or more control signals to the autonomous driving vehicle to cause the autonomous driving vehicle to move or to remain stationary based on an outcome of determining whether the autonomous driving vehicle can safely move in the predetermined direction.

The following features can be present in the non-transitory computer readable medium in any reasonable combination. The instructions stored on the medium may include a condition that the direction of travel or stationarity of each object is determined by changes in a size of each bounding box, so that when bounding boxes from the series of bounding boxes are larger at later times, those boxes indicate that an object is moving toward the autonomous driving vehicle, and when bounding boxes from the series of bounding boxes are smaller at later times, those boxes indicate that an object is moving away from the autonomous driving vehicle. The speed or stationarity of each object in the bounding boxes may be determined from a rate of change of a size of each bounding box in the series of bounding boxes, wherein when a size of a selected bounding box has a larger size change between successive bounding boxes in the series of bounding boxes, an object corresponding to the selected bounding box has a higher speed, and wherein when a size of the selected bounding box has a smaller size change between successive bounding boxes in the series of bounding boxes, the object corresponding to the selected bounding box has a lower speed. A longer series of road images may be used to determine the direction of travel and the speed of distant objects. When an object determined to be moving toward the autonomous vehicle is present in one of the series of bounding boxes and is not present in one or more later bounding boxes in the series of bounding boxes, a countdown timer may be set to cause the autonomous vehicle to not move until the expiration of the countdown timer. When an object determined to be moving toward the autonomous vehicle is present in one of the series of road images and is not present in one or more later images in the series of road images, a countdown timer can be set to cause the autonomous vehicle to not move until the expiration of the countdown timer. A machine learning device may be used to perform the determining whether the autonomous driving vehicle can safely move in a predetermined direction.

An aspect of the disclosed embodiments relates to a camera vision method for an autonomous driving vehicle. The method includes: determining, from a series of images of one or more roads captured by a camera sensor, a plurality of three-dimensional boundaries for the one or more roads; selecting a series of points (e.g., one or more points) in a three-dimensional space surrounding the autonomous vehicle within the plurality of three-dimensional boundaries for the one or more roads; determining for each of the series of points whether an object is present; determining a stationarity or direction of travel and a speed for each object that is present; determining, based on the direction of travel, the speed, or stationarity of each object, whether the autonomous driving vehicle can safely move in a predetermined direction (or along a predetermined path or trajectory); and sending one or more control signals to the autonomous driving vehicle to cause the autonomous driving vehicle to move or to remain stationary based on the determining whether the autonomous driving vehicle can safely move in the predetermined direction.

The following features can be present in the camera vision method in any reasonable combination. The method may include reducing the extent of the plurality of three-dimensional boundaries to a space where the presence of the object at the speed of the object in the space interferes with the autonomous driving vehicle moving in the predetermined direction. Determining whether the autonomous driving vehicle can safely move in the predetermined direction based on the series of points may require fewer computational resources than determining whether the autonomous driving vehicle can safely move in the predetermined direction based on the entire space within the plurality of three-dimensional boundaries for the one or more roads. The method may include determining from the series of images captured by the camera sensor, whether a view of the camera sensor is occluded by an object preventing the camera sensor from capturing the images of at least a portion of the one or more roads, such that when the view is occluded the autonomous vehicle is caused to not move, and also when the view is not occluded the autonomous vehicle is permitted to move. According to some example embodiments of the method, when the determined speed of an object is above a threshold value, some of the points in the three-dimensional space are located farther away than at least one of the three-dimensional boundaries. In some example embodiments of the method, the three-dimensional space may be divided into cubes of a fixed size containing one or more of the series of points. According to certain example embodiments, the cubes may be collapsed in one dimension to generate two-dimensional squares, wherein the one or more of the series of points are represented by a fixed coordinate value in the one dimension and maintain their coordinate values in the other two dimensions before being collapsed. In some example embodiments, the series of points in the three-dimensional space may be selected to have a fixed height above the ground. According to certain example embodiments, the fixed height may be 0.5 meters, 1.0 meters, or 1.5 meters.

Another aspect of the disclosed embodiments relates to a camera vision method for an autonomous driving vehicle. The method includes receiving a series of road images from a side-view camera sensor of the autonomous vehicle, wherein each image in the series of road images is taken at a different time. The method also includes generating, for each object from objects captured in the series of road images, a series of bounding boxes, wherein each bounding box in the series of bounding boxes for an object bounds the object in an image from the series of road images (e.g., delineates or outlines boundaries of the object and/or boundaries of a space or a volume around the object (the space or the volume includes the object)) and wherein different bounding boxes in the series of bounding boxes for the object correspond to different images. Herein, a bounding box "corresponding to" an image means that the bounding box refers to a pixel of the image. Also, an image corresponding to a bounding box means that the bounding box corresponds to the image. Each bounding box in the series of bounding boxes for the object corresponds to one image in the series of road images. For example, a bounding box can enclose or encompass the object in such a way that the object is within the bounding box in the image to which the bounding box corresponds. The method further includes determining a direction of travel or stationarity for each object from the objects captured in the series of road images. The method also includes determining a speed of each object for which the direction of travel has been determined. The number of objects for which direction of travel will be determined may be less than the total number of objects for which a determination regarding travel direction is made. For example, objects that are deemed to be stationary are not considered for direction of travel calculation. The method also includes determining whether the autonomous driving vehicle can safely move in a predetermined direction or along a predetermined path or trajectory based on the directions of travel, speeds, or stationarity of the objects. The method further includes sending one or more control signals or commands to the autonomous driving vehicle to cause the autonomous driving vehicle to move or to remain stationary based on an outcome of determining whether the autonomous driving vehicle can safely move in the predetermined direction.

The following features may be present in the camera vision method in any reasonable combination. According to some implementations, the method can include determining if an object is moving or stationary using the series of bounding boxes generated for the object. And, if it is determined that the object is moving, a direction of the object's travel and a speed of the object can be determined using the series of bounding boxes generated for the object. For example, the object can be deemed stationary if the bounding boxes in the series of bounding boxes corresponding to the object do not change their size and position between the images corresponding to the bounding boxes. Accordingly, the object can be deemed moving if the bounding boxes in the series of bounding boxes corresponding to the object change their size and/or position between the images corresponding to the bounding boxes. If it is determined that an object is moving, the direction of travel of the object can be determined using changes in a size or a dimension of bounding boxes in the series of bounding boxes generated for the object, wherein, when bounding boxes from the series of bounding boxes that correspond to the road images obtained at later times are larger in one or more dimensions or sizes compared to the bounding boxes from the series of bounding boxes that correspond to the road images obtained at earlier times, then the object is moving toward the autonomous driving vehicle and, when bounding boxes from the series of bounding boxes that correspond to the road images obtained at later times are smaller in one or more dimensions or sizes compared to the bounding boxes from the series of bounding boxes that correspond to the road images obtained at earlier times, then the object is moving away from the autonomous driving vehicle. Alternatively, or additionally, if it is determined that the object is moving, the speed of the object can be determined from a rate of change of a size or a dimension of bounding boxes in the series of bounding boxes generated for the object, such that a larger size change (e.g., a relative size change) between successive bounding boxes in the series of bounding boxes corresponds to a higher speed of the object, and such that a smaller size change between successive bounding boxes in the series of bounding boxes corresponds to a lower speed of the object. For example, successive bounding boxes correspond to successive images in the series of road images. In the method, a longer series of road images may be used to determine the direction of travel and/or the speed of distant objects. When an object determined to be moving toward the autonomous vehicle or away from the autonomous vehicle is present in one of the series of road images and is not present in one or more later images in the series of road images, a countdown timer can be set to cause the autonomous vehicle to not move until the expiration of the countdown timer. A machine learning device can be used to determine whether the autonomous vehicle can safely move in a predetermined direction, in the method. An image zoom may be performed according to one or more distances to the objects, wherein more image zoom is selected for objects farther from the autonomous driving vehicle and less image zoom is selected for objects closer to the autonomous driving vehicle.

An aspect of the disclosed embodiments relates to a camera vision method for an autonomous driving vehicle, the method comprising: receiving a series of road images from a side-view camera sensor of the autonomous driving vehicle, wherein each image in the series of road images is taken at a different time; generating, for each object from objects captured in the series of road images, a series of bounding boxes in the series of road images, wherein each bounding box corresponds to an image in the series of road images; determining, for each object from the objects, a direction of travel or that the object is stationary; determining a speed of each object for which the direction of travel has been determined; determining, based on the directions of travel, speeds, or stationarity of the objects, whether the autonomous driving vehicle can safely move in a predetermined direction; and sending one or more control signals to the autonomous driving vehicle to cause the autonomous driving vehicle to move or to remain stationary based on the determining whether the autonomous driving vehicle can safely move in the predetermined direction.

In some example embodiments of the camera vision method, the direction of travel of an object is determined using changes in a size of bounding boxes in the series of bounding boxes generated for the object, wherein, when bounding boxes from the series of bounding boxes that correspond to the road images obtained at later times are larger in one or more dimensions compared to the bounding boxes from the series of bounding boxes that correspond to the road images obtained at earlier times, the object is moving toward the autonomous driving vehicle and, when bounding boxes from the series of bounding boxes that correspond to the road images obtained at later times are smaller in one or more dimensions compared to the bounding boxes from the series of bounding boxes that correspond to the road images obtained at earlier times, the object is moving away from the autonomous driving vehicle. According to certain example embodiments of the camera vision method, the speed of an object is determined from a rate of change of a size of bounding boxes in the series of bounding boxes generated for the object, such that a larger size change between successive bounding boxes in the series of bounding boxes corresponds to a higher speed of the object, and, correspondingly, a smaller size change between successive bounding boxes in the series of bounding boxes corresponds to a lower speed of the object. In some example embodiments, a longer series of road images is used to determine the direction of travel and the speed of distant objects compared to a series of road images that is used to determine the direction of travel and the speed of objects that are close to the autonomous driving vehicle. According to some example embodiments, the camera vision method further comprises, when an object determined to be moving toward the autonomous driving vehicle is present in one image of the series of road images and is not present in one or more later images in the series of road images, setting a countdown timer to cause the autonomous driving vehicle to not move until the expiration of the countdown timer. In certain example embodiments, the determining whether the autonomous driving vehicle can safely move in the predetermined direction is performed using a machine learning device. In some example embodiments, the method further comprises performing an image zoom according to one or more distances to the objects, wherein more image zoom is selected for objects farther from the autonomous driving vehicle and less image zoom is selected for objects closer to the autonomous driving vehicle.

An aspect of the disclosed embodiments relates to an apparatus for an autonomous driving vehicle, comprising at least one processor and a memory including executable instructions that, when executed by the at least one processor, cause the apparatus to perform at least the following operations: receive a series of road images from a side-view camera sensor of the autonomous driving vehicle, wherein each image in the series of road images is taken at a different time; generate, for each object from objects captured in the series of road images, a series of bounding boxes in the series of road images, wherein each bounding box in the series of bounding boxes corresponds to an image in the series of road images; determine, for each object from the objects, a direction of travel or that the object is stationary; determine a speed of each object for which the direction of travel has been determined; determine, based on the directions of travel, speeds, or stationarity of the objects, whether the autonomous driving vehicle can safely move in a predetermined direction; and send one or more control signals to the autonomous driving vehicle to cause the autonomous driving vehicle to move or to remain stationary based on the determining whether the autonomous driving vehicle can safely move in the predetermined direction.

In some example embodiments of the apparatus for an autonomous driving vehicle, the direction of travel of an object is determined using changes in a size of bounding boxes in the series of bounding boxes generated for the object, wherein, when bounding boxes from the series of bounding boxes that correspond to the road images obtained at later times are larger in one or more dimensions compared to the bounding boxes from the series of bounding boxes that correspond to the road images obtained at earlier times, the object is moving toward the autonomous driving vehicle and, when bounding boxes from the series of bounding boxes that correspond to the road images obtained at later times are smaller in one or more dimensions compared to the bounding boxes from the series of bounding boxes that correspond to the road images obtained at earlier times, the object is moving away from the autonomous driving vehicle. According to certain example embodiments of the apparatus, the speed of an object is determined from a rate of change of a size of bounding boxes in the series of bounding boxes generated for the object, such that a larger size change between successive bounding boxes in the series of bounding boxes corresponds to a higher speed of the object, and, correspondingly, a smaller size change between successive bounding boxes in the series of bounding boxes corresponds to a lower speed of the object. According to certain example embodiments, a longer series of road images is used to determine the direction of travel and the speed of distant objects compared to a series of road images that is used to determine the direction of travel and the speed of objects that are close to the autonomous driving vehicle. In some example embodiments, the executable instructions further cause the apparatus to perform: when an object determined to be moving toward the autonomous driving vehicle is present in one image of the series of road images and is not present in one or more later images in the series of road images, setting a countdown timer to cause the autonomous driving vehicle to not move until the expiration of the countdown timer. According to some example embodiments, the determining whether the autonomous driving vehicle can safely move in the predetermined direction is performed using a machine learning device. In some example embodiments of the apparatus, the executable instructions further cause the apparatus to perform: perform an image zoom according to one or more distances to the objects, wherein more image zoom is selected for objects farther from the autonomous driving vehicle and less image zoom is selected for objects closer to the autonomous driving vehicle.

Yet another aspect of the disclosed embodiments relates to a non-transitory computer readable medium storing executable instructions for an autonomous driving vehicle that, when executed by at least one processor, cause the at least one processor to perform at least the following: receive a series of road images from a side-view camera sensor of the autonomous driving vehicle, wherein each image in the series of road images is taken at a different time; generate, for each object from objects captured in the series of road images, a series of bounding boxes in the series of road images, wherein each bounding box in the series of bounding boxes corresponds to an image in the series of road images; determine, for each object from the objects, a direction of travel or that the object is stationary; determine a speed of each object for which the direction of travel has been determined; determine, based on the directions of travel, speeds, or stationarity of the objects, whether the autonomous driving vehicle can safely move in a predetermined direction; and send one or more control signals to the autonomous driving vehicle to cause the autonomous driving vehicle to move or to remain stationary based on the determining whether the autonomous driving vehicle can safely move in the predetermined direction.

In some example embodiments of the non-transitory computer readable medium, direction of travel of an object is determined using changes in a size of bounding boxes in the series of bounding boxes generated for the object, wherein, when bounding boxes from the series of bounding boxes that correspond to the road images obtained at later times are larger in one or more dimensions compared to the bounding boxes from the series of bounding boxes that correspond to the road images obtained at earlier times, the object is moving toward the autonomous driving vehicle and, when bounding boxes from the series of bounding boxes that correspond to the road images obtained at later times are smaller in one or more dimensions compared to the bounding boxes from the series of bounding boxes that correspond to the road images obtained at earlier times, the object is moving away from the autonomous driving vehicle. According to certain example embodiments, the speed of an object is determined from a rate of change of a size of bounding boxes in the series of bounding boxes generated for the object, such that a larger size change between successive bounding boxes in the series of bounding boxes corresponds to a higher speed of the object, and, correspondingly, a smaller size change between successive bounding boxes in the series of bounding boxes corresponds to a lower speed of the object. In some example embodiments, a longer series of road images is used to determine the direction of travel and the speed of distant objects compared to a series of road images that is used to determine the direction of travel and the speed of objects that are close to the autonomous driving vehicle. According to some example embodiments, the instructions, when executed by the at least one processor, further cause the at least one processor to perform: when an object determined to be moving toward the autonomous vehicle is present in one image of the series of road images and is not present in one or more later images in the series of road images, set a countdown timer to cause the autonomous driving vehicle to not move until the expiration of the countdown timer. According to certain example embodiments of the non-transitory computer readable medium, the determining whether the autonomous driving vehicle can safely move in the predetermined direction is performed using a machine learning device.

An aspect of the disclosed embodiments relates to a camera vision method for an autonomous driving vehicle, the method comprising: determining, from a series of images of one or more roads captured by a camera sensor of the autonomous driving vehicle, a plurality of three-dimensional boundaries for the one or more roads; selecting a series of points in a three-dimensional space surrounding the autonomous driving vehicle within the plurality of three-dimensional boundaries for the one or more roads; determining for each point in the series of points whether an object is present at the point; determining a stationarity or a direction of travel and a speed for each object that is present at a point in the series of points; determining, based on the direction of travel, the speed, or the stationarity of each object that is present at a point in the series of points, whether the autonomous driving vehicle can safely move in a predetermined direction; and sending one or more control signals to the autonomous driving vehicle to cause the autonomous driving vehicle to move or to remain stationary based on the determining whether the autonomous driving vehicle can safely move in the predetermined direction.

In some example embodiments of the camera vision method, the method further comprises reducing an extent of the plurality of three-dimensional boundaries to a space where the presence of an object at a speed of the object in the space interferes with the autonomous driving vehicle moving in the predetermined direction. According to certain example embodiments, the method further comprises determining from the series of images captured by the camera sensor, whether a view of the camera sensor is occluded by an object preventing the camera sensor from capturing images of at least a portion of the one or more roads, wherein when the view is occluded the autonomous driving vehicle is caused to not move, and wherein when the view is not occluded the autonomous driving vehicle is permitted to move. In some example embodiments, the three-dimensional space is divided into cubes of a fixed size containing one or more points of the series of points. According to some example embodiments, the method further comprises dividing the three-dimensional space into cubes of a fixed size. According to certain example embodiments, the cubes contain one or more points of the series of points. In some example embodiments, the cubes are collapsed in one dimension to generate two-dimensional squares, wherein the one or more points of the series of points are represented on the squares by points having a fixed coordinate value in the one dimension and having their coordinate values in the other two dimensions equal to those of the one or more points before the cubes were collapsed. According to certain example embodiments, the method further comprises producing two-dimensional squares from the cubes, wherein the two-dimensional squares correspond to the cubes collapsed along one dimension. In some example embodiments, the one or more points of the series of points that are within the cubes are transferred to the two-dimensional squares. In some example embodiments, the one or more points of the series of points are represented on the squares by a fixed coordinate value in the one dimension and maintain their coordinate values in the other two dimensions. According to certain example embodiments, the cubes are collapsed in one dimension to generate two-dimensional squares, wherein the one or more points of the series of points are represented on the squares by a fixed coordinate value in the one dimension and maintain their coordinate values in the other two dimensions before being collapsed. In some example embodiments, the series of points in the three-dimensional space are selected to have a fixed height above the ground. According to certain example embodiments of the camera vision method, the fixed height is 0.5 meters, 1.0 meter, or 1.5 meters. According to certain example embodiments, the fixed height can be any height in the range between 0.1 meters and 10 meters. In some example embodiments, the determining whether the autonomous driving vehicle can safely move in the predetermined direction for the series of points requires fewer computational resources than determining whether the autonomous driving vehicle can safely move in the predetermined direction within the plurality of three-dimensional boundaries for the one or more roads. According to some example embodiments of the camera vision method, when the determined speed of an object is above a threshold value, some of the points in the three-dimensional space are located farther away than at least one of the three-dimensional boundaries.

Implementations of the technology disclosed in this patent document and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the technology disclosed herein can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

In this disclosure, LiDAR and LIDAR are used to refer to light detection and ranging devices and methods, and alternatively, or additionally, laser detection and ranging devices and methods. The use of these acronyms does not imply limitation of the described devices, systems, or methods to the use of one over the other.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A camera vision method for an autonomous driving vehicle, the method comprising:

receiving a series of road images from a side-view camera sensor of the autonomous driving vehicle, wherein each image in the series of road images is taken at a different time,
   wherein a larger quantity of the series of road images is analyzed to determine directions of travel and speeds of distant objects compared to the series of road images that are analyzed to determine directions of travel and speeds of objects that are close to the autonomous driving vehicle;

generating, for each object from objects captured in the series of road images, a series of bounding boxes in the series of road images, wherein each bounding box corresponds to an image in the series of road images;

determining, for each object from the objects, a direction of travel or that the object is stationary;

determining a speed of each object for which the direction of travel has been determined;

determining, based on the directions of travel, speeds, or stationarity of the objects, whether the autonomous driving vehicle can safely move in a predetermined direction,
   wherein a quantity of the series of road images that are analyzed before the determining whether the autonomous driving vehicle can safely move in the predetermined direction depends on a noise level of the directions of travel, speeds, or stationarity of the objects; and sending one or more control signals to the autonomous driving vehicle to cause the autonomous driving vehicle to move or to remain stationary based on the determining whether the autonomous driving vehicle can safely move in the predetermined direction.

2. The method of claim 1, wherein the direction of travel of an object from the objects is determined using changes in a size of bounding boxes in the series of bounding boxes generated for the object, wherein, when bounding boxes from the series of bounding boxes that correspond to the road images obtained at later times are larger in one or more dimensions compared to the bounding boxes from the series of bounding boxes that correspond to the road images obtained at earlier times, the object is moving toward the autonomous driving vehicle and, when bounding boxes from the series of bounding boxes that correspond to the road images obtained at later times are smaller in one or more dimensions compared to the bounding boxes from the series of bounding boxes that correspond to the road images obtained at earlier times, the object is moving away from the autonomous driving vehicle.

3. The method of claim 1, further comprising, when an object determined to be moving toward the autonomous driving vehicle is present in one image of the series of road images and is not present in one or more later images in the series of road images, setting a countdown timer to cause the autonomous driving vehicle to not move until the expiration of the countdown timer.

4. An apparatus for an autonomous driving vehicle, comprising:
at least one processor; and
a memory including executable instructions that, when executed by the at least one processor, cause the apparatus to perform at least:
   receive a series of road images from a side-view camera sensor of the autonomous driving vehicle, wherein each image in the series of road images is taken at a different time,
     wherein a larger quantity of the series of road images is used to determine directions of travel and speeds of distant objects compared to the series of road images that are used to determine directions of travel and speeds of objects that are close to the autonomous driving vehicle;

generate, for each object from objects captured in the series of road images, a series of bounding boxes in the series of road images, wherein each bounding box in the series of bounding boxes corresponds to an image in the series of road images;

determine, for each object from the objects, a direction of travel or that the object is stationary;

determine a speed of each object for which the direction of travel has been determined;

determine, based on the directions of travel, speeds, or stationarity of the objects, whether the autonomous driving vehicle can safely move in a predetermined direction,
     wherein a quantity of the series of road images that are analyzed before the determining whether the autonomous driving vehicle can safely move in the predetermined direction depends on a noise level in the directions of travel, speeds, or stationarity of the objects; and send one or more control signals to the autonomous driving vehicle to cause the autonomous driving vehicle to move or to remain stationary based on the determining whether the autonomous driving vehicle can safely move in the predetermined direction.

5. The apparatus of claim 4, wherein the direction of travel of an object from the objects is determined using changes in a size of bounding boxes in the series of bounding boxes generated for the object, wherein, when bounding boxes from the series of bounding boxes that correspond to the road images obtained at later times are larger in one or more dimensions compared to the bounding boxes from the series of bounding boxes that correspond to the road images obtained at earlier times, the object is moving toward the autonomous driving vehicle and, when bounding boxes from the series of bounding boxes that correspond to the road images obtained at later times are smaller in one or more dimensions compared to the bounding boxes from the series of bounding boxes that correspond to the road images obtained at earlier times, the object is moving away from the autonomous driving vehicle.

6. The apparatus of claim 4, wherein the speed of an object from the objects is determined from a rate of change of a size of bounding boxes in the series of bounding boxes generated for the object, such that a larger size change between successive bounding boxes in the series of bounding boxes corresponds to a higher speed of the object, and a smaller size change between successive bounding boxes in the series of bounding boxes corresponds to a lower speed of the object.

7. The apparatus of claim 4, wherein the determining whether the autonomous driving vehicle can safely move in the predetermined direction is performed using a machine learning device.

8. The apparatus of claim 4, wherein the executable instructions further cause the apparatus to perform an image zoom according to one or more distances to the objects, wherein more image zoom is selected for objects farther from the autonomous driving vehicle and less image zoom is selected for objects closer to the autonomous driving vehicle.

9. A non-transitory computer readable medium storing executable instructions for an autonomous driving vehicle that, when executed by at least one processor, cause the at least one processor to perform at least the following:
  receive a series of road images from a side-view camera sensor of the autonomous driving vehicle, wherein each image in the series of road images is taken at a different time,
    wherein a larger quantity of the series of road images is used to determine directions of travel and speeds of distant objects compared to the series of road images that are used to determine directions of travel and speeds of objects that are close to the autonomous driving vehicle;
  generate, for each object from objects captured in the series of road images, a series of bounding boxes in the series of road images, wherein each bounding box in the series of bounding boxes corresponds to an image in the series of road images;
  determine, for each object from the objects, a direction of travel or that the object is stationary;
  determine a speed of each object for which the direction of travel has been determined;
  determine, based on the directions of travel, speeds, or stationarity of the objects, whether the autonomous driving vehicle can safely move in a predetermined direction,
    wherein a quantity of the series of road images that are analyzed before the determining whether the autonomous driving vehicle can safely move in the predetermined direction depends on a noise level in the directions of travel, speeds, or stationarity of the objects; and
  send one or more control signals to the autonomous driving vehicle to cause the autonomous driving vehicle to move or to remain stationary based on the determining whether the autonomous driving vehicle can safely move in the predetermined direction.

10. The non-transitory computer readable medium of claim 9, wherein the direction of travel of an object from the objects is determined using changes in a size of bounding boxes in the series of bounding boxes generated for the object, wherein, when bounding boxes from the series of bounding boxes that correspond to the road images obtained at later times are larger in one or more dimensions compared to the bounding boxes from the series of bounding boxes that correspond to the road images obtained at earlier times, the object is moving toward the autonomous driving vehicle and, when bounding boxes from the series of bounding boxes that correspond to the road images obtained at later times are smaller in one or more dimensions compared to the bounding boxes from the series of bounding boxes that correspond to the road images obtained at earlier times, the object is moving away from the autonomous driving vehicle.

11. The non-transitory computer readable medium of claim 9, wherein the speed of an object from the objects is determined from a rate of change of a size of bounding boxes in the series of bounding boxes generated for the object, such that a larger size change between successive bounding boxes in the series of bounding boxes corresponds to a higher speed of the object, and a smaller size change between successive bounding boxes in the series of bounding boxes corresponds to a lower speed of the object.

12. The non-transitory computer readable medium of claim 9, wherein the instructions, when executed by the at least one processor, further cause the at least one processor to perform: when an object determined to be moving toward the autonomous driving vehicle is present in one image of the series of road images and is not present in one or more later images in the series of road images, set a countdown timer to cause the autonomous driving vehicle to not move until the expiration of the countdown timer.

13. The non-transitory computer readable medium of claim 9, wherein the determining whether the autonomous driving vehicle can safely move in the predetermined direction is performed using a machine learning device.

14. A camera vision method for an autonomous driving vehicle, the method comprising:
  determining, from a series of images of one or more roads captured by a camera sensor of the autonomous driving vehicle, a plurality of three-dimensional boundaries for the one or more roads,
    wherein a larger quantity of the series of road images is used to determine directions of travel and speeds of distant objects compared to the series of road images that are used to determine directions of travel and speeds of objects that are close to the autonomous driving vehicle;
  selecting a series of points in a three-dimensional space surrounding the autonomous driving vehicle within the plurality of three-dimensional boundaries for the one or more roads;
  determining, for each point in the series of points, whether an object is present at the point;
  determining a stationarity or a direction of travel and a speed for each object that is present at a point in the series of points;
  determining, based on the direction of travel, the speed, or the stationarity of each object that is present at a point in the series of points, whether the autonomous driving vehicle can safely move in a predetermined direction,
    wherein a quantity of the series of road images that are analyzed before the determining whether the autonomous driving vehicle can safely move in the predetermined direction depends on a noise level in the directions of travel, speeds, or stationarity of the objects; and
  sending one or more control signals to the autonomous driving vehicle to cause the autonomous driving vehicle to move or to remain stationary based on the determining whether the autonomous driving vehicle can safely move in the predetermined direction.

15. The method of claim 14, further comprising:
  reducing an extent of the plurality of three-dimensional boundaries to a space where the presence of an object at a speed of the object in the space interferes with the autonomous driving vehicle moving in the predetermined direction.

16. The method of claim 14, further comprising:
  determining from the series of images captured by the camera sensor, whether a view of the camera sensor is occluded by an object preventing the camera sensor from capturing images of at least a portion of the one or more roads, wherein when the view is occluded the autonomous driving vehicle is caused to not move, and wherein when the view is not occluded the autonomous driving vehicle is permitted to move.

17. The method of claim 14, wherein the three-dimensional space is divided into cubes of a fixed size containing one or more points of the series of points.

18. The method of claim 17, wherein the cubes are collapsed in one dimension to generate two-dimensional squares, wherein the one or more points of the series of points are represented on the squares by a fixed coordinate value in the one dimension and maintain their coordinate values in the other two dimensions before being collapsed.

19. The method of claim 14, wherein the series of points in the three-dimensional space are selected to have a fixed height above the ground.

\* \* \* \* \*